(12) United States Patent
Yang

(10) Patent No.: US 11,956,170 B2
(45) Date of Patent: Apr. 9, 2024

(54) METHOD FOR MEASURING REFERENCE SIGNAL, METHOD FOR CONFIGURING REFERENCE SIGNAL RESOURCE, AND DEVICE

(71) Applicant: VIVO MOBILE COMMUNICATION CO., LTD., Guangdong (CN)

(72) Inventor: Yu Yang, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 348 days.

(21) Appl. No.: 17/513,264

(22) Filed: Oct. 28, 2021

(65) Prior Publication Data
US 2022/0052814 A1 Feb. 17, 2022

Related U.S. Application Data

(63) Continuation of application No. PCT/CN2020/087813, filed on Apr. 29, 2020.

(30) Foreign Application Priority Data

Apr. 30, 2019 (CN) .......................... 201910365423.6

(51) Int. Cl.
*H04L 5/00* (2006.01)
*H04L 41/0803* (2022.01)
*H04W 24/08* (2009.01)

(52) U.S. Cl.
CPC ........ *H04L 5/0048* (2013.01); *H04L 41/0803* (2013.01); *H04W 24/08* (2013.01)

(58) Field of Classification Search
CPC ... H04L 41/0803; H04L 5/0048; H04W 24/08
(Continued)

(56) References Cited

U.S. PATENT DOCUMENTS 10,057,040 B2 * 8/2018 Nagata .................. H04L 5/0057
11,039,329 B2 * 6/2021 Marinier ................ H04B 17/24
(Continued)

FOREIGN PATENT DOCUMENTS

| CN | 103037397 A | 4/2013 |
| CN | 103891337 A | 6/2014 |

(Continued)

OTHER PUBLICATIONS

Chinese Office Action dated Jan. 15, 2021 as received in application No. 201910365423.6.
(Continued)

*Primary Examiner* — Robert J Lopata
(74) *Attorney, Agent, or Firm* — BROOKS KUSHMAN P.C.

(57) ABSTRACT

A method for measuring a reference signal, a method for configuring a reference signal resource, and a device are provided. The method for measuring a reference signal includes: determining a first set of reference signal resources for channel measurement and a second set of reference signal resources for interference measurement; performing measurement on a reference signal carried by at least one second reference signal resource in the second set of reference signal resources, to obtain interference corresponding to a first reference signal resource in the first set of reference signal resources, where during measurement on the reference signal carried by the second reference signal resource, if the second reference signal resource overlaps a third reference signal resource in the first set of reference signal resources, a position for measuring the reference signal carried by the second reference signal resource is a resource position corresponding to the third reference signal resource.

20 Claims, 13 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 11,228,356 | B2* | 1/2022 | Faxér | H04L 5/0057 |
| 2014/0043988 | A1* | 2/2014 | Chen | H04L 1/0026 |
| | | | | 370/252 |
| 2014/0211723 | A1 | 7/2014 | Xia et al. | |
| 2015/0029966 | A1 | 1/2015 | Park et al. | |
| 2015/0162966 | A1 | 6/2015 | Kim et al. | |
| 2015/0200760 | A1 | 7/2015 | Xia et al. | |
| 2017/0180194 | A1 | 6/2017 | Noh et al. | |
| 2019/0281487 | A1* | 9/2019 | Liu | H04L 5/0048 |
| 2019/0356364 | A1* | 11/2019 | Maamari | H04L 5/0062 |
| 2020/0119797 | A1* | 4/2020 | Wang | H04B 7/0632 |
| 2021/0258052 | A1* | 8/2021 | Gao | H04B 7/0617 |
| 2021/0288707 | A1* | 9/2021 | Hang | H04B 7/0626 |
| 2021/0320768 | A1* | 10/2021 | Yuan | H04L 5/0073 |
| 2021/0336712 | A1* | 10/2021 | Yang | H04L 5/0091 |

FOREIGN PATENT DOCUMENTS

| | | |
|---|---|---|
| CN | 104106223 A | 10/2014 |
| CN | 104428998 A | 3/2015 |
| CN | 107819559 A | 3/2018 |
| CN | 108432174 A | 8/2018 |
| CN | 109151887 A | 1/2019 |
| EP | 2750433 A1 | 2/2014 |
| WO | 2014052341 A1 | 4/2014 |

OTHER PUBLICATIONS

International Search Report and Written Opinion dated Nov. 11, 2021 as received in application No. PCT/CN2020087813.
"Physical Layer Procedures for data" 3GPP TS 38.214, 2018.
European Search Report in Application No. 20799099.5 dated May 24, 2022.

* cited by examiner

Send first configuration information and second configuration information, where the first configuration information is used for determining a first set of reference signal resources by a terminal device, and the first set of reference signal resources are used for channel measurement; the second configuration information is for determining a second set of reference signal resources by the terminal device, and the second set of reference signal resources are used for interference measurement; interference corresponding to a first reference signal resource in the first set of reference signal resources is obtained through measurement on a reference signal carried by at least one second reference signal resource in the second set of reference signal resources; and during measurement on the reference signal carried by the second reference signal resource, if the second reference signal resource overlaps a third reference signal resource in the first set of reference signal resources, a position for measuring the reference signal carried by the second reference signal resource is a resource position corresponding to the third reference signal resource — S801

FIG. 8

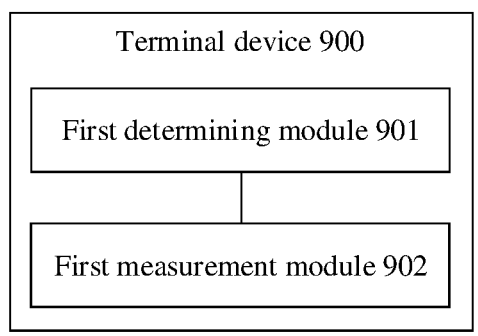

FIG. 9

METHOD FOR MEASURING REFERENCE SIGNAL, METHOD FOR CONFIGURING REFERENCE SIGNAL RESOURCE, AND DEVICE

CROSS-REFERENCE TO RELATED APPLICATIONS

This application is a continuation application of PCT Application No. PCT/CN2020/087813 filed on Apr. 29, 2020, which claims priority to Chinese Patent Application No. 201910365423.6, filed in China on Apr. 30, 2019, disclosures of which are incorporated herein by reference in their entireties.

TECHNICAL FIELD

This disclosure relates to the field of communications technologies, and more specifically, to a method for measuring a reference signal, a method for configuring a reference signal resource, and a device.

BACKGROUND

To support access of a larger number of users, multiple-input multiple-output (MIMO) technology with more antenna ports in a larger scale, such as the massive MIMO technology that uses a large quantity of antenna arrays, has been introduced into mobile communications systems. Beamforming is one of key technologies for implementing multi-user MIMO (MU-MIMO) in massive MIMO. With beamforming, a directional beam can be produced by adjusting a weighting coefficient of each array element in the antenna array. Different beams obtained through beamforming have different quality. Therefore, measurement needs to be performed to select an appropriate beam based on measurement results for signal or channel transmission.

Currently, during beam measurement, a network device configures, for a terminal device (User Equipment, UE), a reference signal resource set (RS Resource Set) for channel measurement and an RS resource set for interference measurement. The configured RS resource set for channel measurement may overlap the RS resource set for interference measurement.

However, in a case that the configured RS resource set for channel measurement overlaps the RS resource set for interference measurement, it is still unclear RSs carried on which RS resources are measured for interference measurement, leading to inaccurately measured interference.

SUMMARY

Embodiments of this disclosure provide a method for measuring a reference signal, a method for configuring a reference signal resource, and a device.

According to a first aspect, this disclosure provides a method for measuring a reference signal, applied to a terminal device, where the method includes:

determining a first set of reference signal resources and a second set of reference signal resources, where the first set of reference signal resources are used for channel measurement, and the second set of reference signal resources are used for interference measurement; and performing measurement on a reference signal carried by at least one second reference signal resource in the second set of reference signal resources, to obtain interference corresponding to a first reference signal resource in the first set of reference signal resources, where during measurement on the reference signal carried by the second reference signal resource, if the second reference signal resource overlaps a third reference signal resource in the first set of reference signal resources, a position for measuring the reference signal carried by the second reference signal resource is a resource position corresponding to the third reference signal resource.

According to a second aspect, this disclosure provides a method for configuring a reference signal resource, applied to a network device, where the method includes:

sending first configuration information and second configuration information; where the first configuration information is used for determining a first set of reference signal resources by a terminal device, and the first set of reference signal resources are used for channel measurement; the second configuration information is used for determining a second set of reference signal resources by the terminal device, and the second set of reference signal resources are used for interference measurement; interference corresponding to a first reference signal resource in the first set of reference signal resources is obtained through measurement on a reference signal carried by at least one second reference signal resource in the second set of reference signal resources; and during measurement on the reference signal carried by the second reference signal resource, if the second reference signal resource overlaps a third reference signal resource in the first set of reference signal resources, a position for measuring the reference signal carried by the second reference signal resource is a resource position corresponding to the third reference signal resource.

According to a third aspect, this disclosure provides a terminal device, where the terminal device includes:

a first determining module, configured to determine a first set of reference signal resources and a second set of reference signal resources, where the first set of reference signal resources are used for channel measurement, and the second set of reference signal resources are used for interference measurement; and a first measurement module, configured to perform measurement on a reference signal carried by at least one second reference signal resource in the second set of reference signal resources, to obtain interference corresponding to a first reference signal resource in the first set of reference signal resources, where during measurement on the reference signal carried by the second reference signal resource, if the second reference signal resource overlaps a third reference signal resource in the first set of reference signal resources, a position for measuring the reference signal carried by the second reference signal resource is a resource position corresponding to the third reference signal resource.

According to a fourth aspect, this disclosure provides a network device, where the network device includes:

a transmitting module, configured to send first configuration information and second configuration information; where the first configuration information is used for determining a first set of reference signal resources by a terminal device, and the first set of reference signal resources are used for channel measurement; the second configuration information is used for determining a second set of reference signal resources by the terminal device, and the second set of reference signal resources are used for interference measurement; interference corresponding to a first reference signal resource in the first set of reference signal resources is obtained through measurement on a reference signal carried by at least one second reference signal resource in the second set of reference signal resources; and during measurement on the reference signal carried by the second reference signal resource, if the second reference signal resource overlaps a third reference signal resource in the first set of reference signal resources, a position for measuring the reference signal carried by the second reference signal resource is a resource position corresponding to the third reference signal resource.

According to a fifth aspect, this disclosure provides a terminal device, where the terminal device includes a memory, a processor, and a program stored in the memory and capable of running on the processor, and when the program is executed by the processor, the steps of the method according to the first aspect are implemented.

According to a sixth aspect, this disclosure provides a network device, where the network device includes a memory, a processor, and a program stored in the memory and capable of running on the processor, and when the program is executed by the processor, the steps of the method according to the second aspect are implemented.

According to a seventh aspect, this disclosure provides a computer-readable storage medium, where a program is stored in the computer-readable storage medium, and when the program is executed by a processor, the steps of the method according to the first aspect or the second aspect are implemented.

BRIEF DESCRIPTION OF DRAWINGS

To describe the technical solutions in the embodiments of this disclosure or in the related art more clearly, the following briefly describes the accompanying drawings required for describing the embodiments or the related art. Apparently, the accompanying drawings in the following description show merely some embodiments recorded in this disclosure, and a person of ordinary skill in the art may still derive other drawings from these accompanying drawings.

FIG. 8 is a schematic flowchart of a method for configuring a reference signal resource according to an embodiment of this disclosure;

FIG. 9 is a first schematic structural diagram of a terminal device 900 according to an embodiment of this disclosure;

DESCRIPTION OF EMBODIMENTS

To make a person skilled in the art understand the technical solutions in this disclosure better, the following clearly describes the technical solutions in the embodiments of this disclosure with reference to the accompanying drawings in the embodiments of this disclosure. Apparently, the described embodiments are merely some but not all of the embodiments of this disclosure. All other embodiments obtained by a person of ordinary skill in the art based on the embodiments of this disclosure shall fall within the protection scope of this disclosure.

It should be understood that the technical solutions in the embodiments of this disclosure can be applied to various communications systems, such as a global system for mobile communications (GSM), a code division multiple access (CDMA) system, wideband code division multiple access (WCDMA), a general packet radio service (GPRS), a long term evolution (LTE) system, an LTE frequency division duplex (FDD) system, an LTE time division duplex (TDD), a universal mobile telecommunications system (UMTS) or a worldwide interoperability for microwave access (WiMAX) communications system, a 5G system, or a new radio (NR) system.

A terminal device (User Equipment, UE) is also referred to as a mobile terminal, a mobile terminal device, and the like, and may communicate with at least one core network through a radio access network (for example, RAN). The terminal device may be a mobile terminal, such as a mobile phone (or referred to as a "cellular" phone) or a computer with a mobile terminal. For example, the terminal device may be a portable, pocket-sized, handheld, computer built-in, or in-vehicle mobile apparatus, which exchanges voice and/or data with the radio access network.

A network device is an apparatus deployed in a radio access network and used for configuring a reference signal resource. The network device may be a base station, and the base station may be a base station (Base Transceiver Station, BTS) in GSM or CDMA, may be a NodeB in WCDMA, or may be an evolved NodeB (eNB or e-NodeB) in LTE, a 5G NodeB (gNB), or a network-side device in a subsequent evolved communications system. However, the terms used do not constitute any limitation on the protection scope of this disclosure.

It should be noted that, during description of specific embodiments, sequence numbers of processes do not mean execution sequences, and the execution sequences of the processes should be determined according to functions and internal logic of the processes, and should not be construed as any limitation on the implementation processes in the embodiments of this disclosure.

The following describes a method for measuring a reference signal applied to a terminal device with reference to FIG. 1 to FIG. 7.

Figure 1:
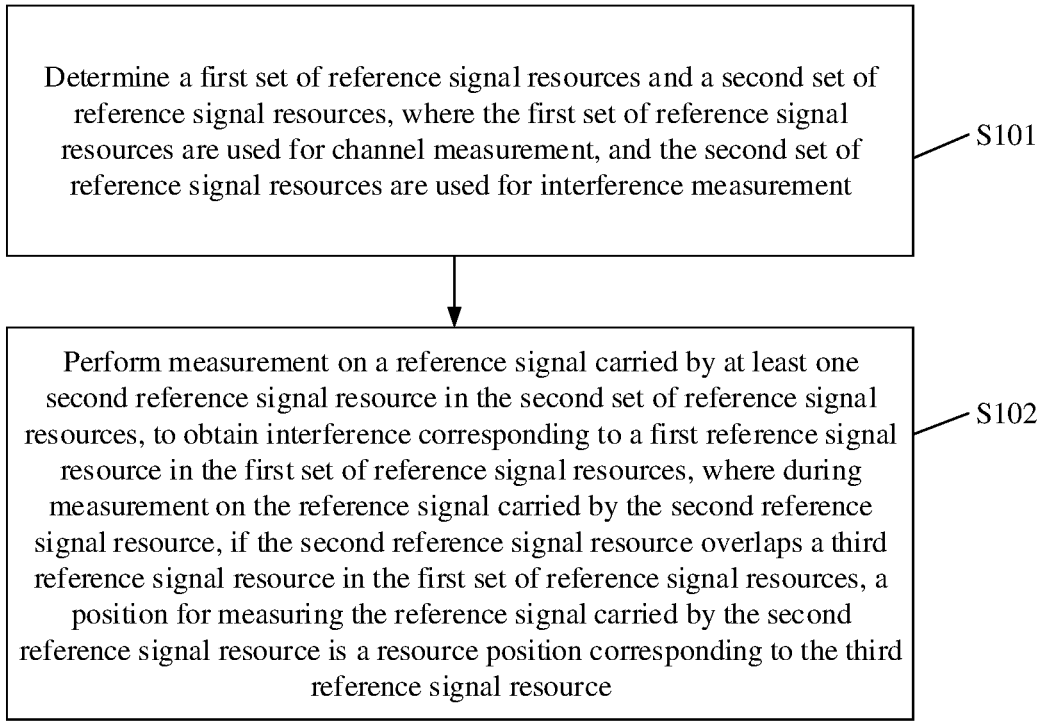
FIG. 1 is a first schematic flowchart of a method for measuring a reference signal according to an embodiment of this disclosure.

FIG. 1 shows a method for measuring a reference signal applied to a terminal device according to an embodiment of this disclosure. As shown in FIG. 1, the method may include the following steps 101 and 102.

Step 101: Determine a first set of reference signal resources and a second set of reference signal resources, where the first set of reference signal resources are used for channel measurement, and the second set of reference signal resources are used for interference measurement.

Optionally, the first set of reference signal resources may be determined based on first configuration information that is sent from a network device and used for configuring the first set of reference signal resources; and the second set of reference signal resources may be determined based on second configuration information that is sent from the network device and used for configuring the second set of reference signal resources. The first configuration information and the second configuration information may be radio resource control (RRC) or other higher-layer information.

The first set of reference signal resources may include two or more reference signal resources, and the reference signal resources included in the first set of reference signal resources may include, but are not limited to, a synchronization signal block (SSB) resource or a channel state information-reference signal (CSI-RS) resource.

Optionally, the reference signal resources included in the first set of reference signal resources may be CSI-RS resources, because a CSI-RS-based channel measurement manner is finer than an SSB-based channel measurement manner, a channel obtained through measurement may be more accurate, good for multi-beam and multi-user scheduling on a network side. For ease of description, in this embodiment of the present invention, an example in which the reference signal resources included in the first set of reference signal resources are CSI-RS resources is used for description.

Optionally, the first configuration information may further include information such as quasi co-location (QCL) information of the reference signal resources in the first set of reference signal resources and a value of a repetition parameter (repetition) of the first set of reference signal resources.

The QCL information of the reference signal resources may include, but is not limited to, information such as a source reference signal (source RS or reference signal) and a type of a QCL relationship, and the QCL relationship may include the following types:

QCL type A: {Doppler shift, Doppler spread, average delay, delay spread};
QCL type B: {Doppler shift, Doppler spread};
QCL type C: {Average delay, Doppler shift}; and
QCL type D: {Space receive (Rx) parameter}.

Repetition is a parameter used for determining whether to perform repeated measurement on a transmit beam of the network device. If the value of repetition is on, it indicates that repeated measurement is performed on one transmit beam of the network device; if the value of repetition is off, it indicates that a plurality of transmit beams of the network device are measured in a polling manner.

The second set of reference signal resources may include one or more reference signal resources, and the second set of reference signal resources may include, but is not limited to, at least one of a channel state information-interference measurement (CSI-IM) resource, an interference measurement resource (IMR), or a Non Zero Power Channel State Information Reference Signal (NZP CSI-RS) resource. For ease of description, in this embodiment of the present invention, an example in which the reference signal resources included in the second set of reference signal resources are CSI-IM resources is used for description.

For example, assuming that the network device needs to perform measurement on two downlink beams, the first set of reference signal resources (one CSI-RS resource set) configured by the network device by using the first configuration information may include two CSI-RS resources: CSI-RS resource 1 and CSI-RS resource 2, and the first configuration information also includes QCL information of the two CSI-RS resources. The second set of reference signal resources (one CSI-IM resource set) configured by the network device by using the second configuration information may include two CSI-IM resources: CSI-IM resource 1 and CSI-IM resource 2.

Step 102: Perform measurement on a reference signal carried by at least one second reference signal resource in the second set of reference signal resources, to obtain interference corresponding to a first reference signal resource in the first set of reference signal resources, where during measurement on the reference signal carried by the second reference signal resource, if the second reference signal resource overlaps a third reference signal resource in the first set of reference signal resources, a position for measuring the reference signal carried by the second reference signal resource is a resource position corresponding to the third reference signal resource.

Optionally, during measurement on the reference signal carried by the second reference signal resource, if the second reference signal resource overlaps the third reference signal resource in the first set of reference signal resources, the position for measuring the reference signal carried by the second reference signal resource is an overlapping resource position between the second reference signal resource and the third reference signal resource. In other words, in a case that the second reference signal resource overlaps the third reference signal resource in the first set of reference signal resources, the reference signal carried by the second reference signal is measured on the resource position overlapping the third reference signal resource.

Optionally, at least one first reference signal resource in the first set of reference signal resources may have an association relationship with at least one second reference signal resource in the second set of reference signal resources, and the second reference signal resource having an association relationship with first reference signal resource may be used for interference measurement corresponding to the first reference signal resource.

Further, the at least one second reference signal resource associated with one first reference signal resource may be partially or completely the same as the at least one second reference signal resource associated with another first reference signal resource.

In actual application, at least one reference signal resource in the first set of reference signal resources may overlap at least one reference signal resource in the second set of reference signal resources. For example, if one or more third reference signal resources are included in the first set of reference signal resources, one second reference signal resource and one third reference signal resource may partially or completely overlap, or one second reference signal resource may overlap a plurality of third reference signal resources. In addition, because a plurality of second reference signal resources may be included in the second set of reference signal resources, it may also be possible that a plurality of second reference signal resources and one third reference signal resource partially or completely overlap. The following uses an example for description.

In a first example, a case that one reference signal resource in the first set of reference signal resources overlaps one reference signal resource in the second set of reference signal resources is described. For example, as shown in FIG. 2A to FIG. 2C, it is possible that REs in a resource element pattern (RE pattern) of one CSI-IM resource overlap those of one CSI-RS resource.

Figure 2A:
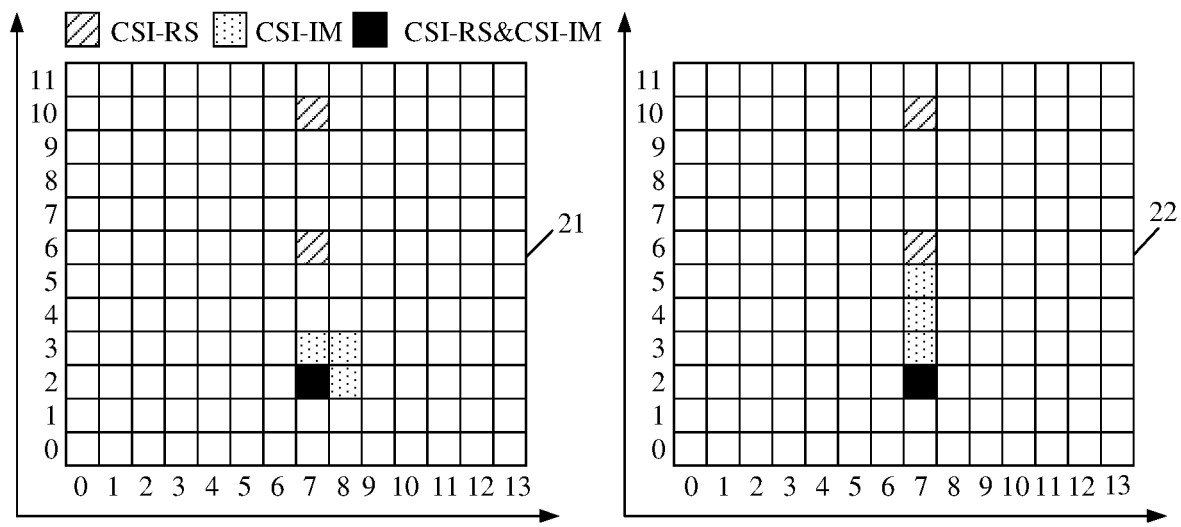
FIG. 2A is a first schematic diagram of an RE pattern according to an embodiment of this disclosure.
Figure 2B:
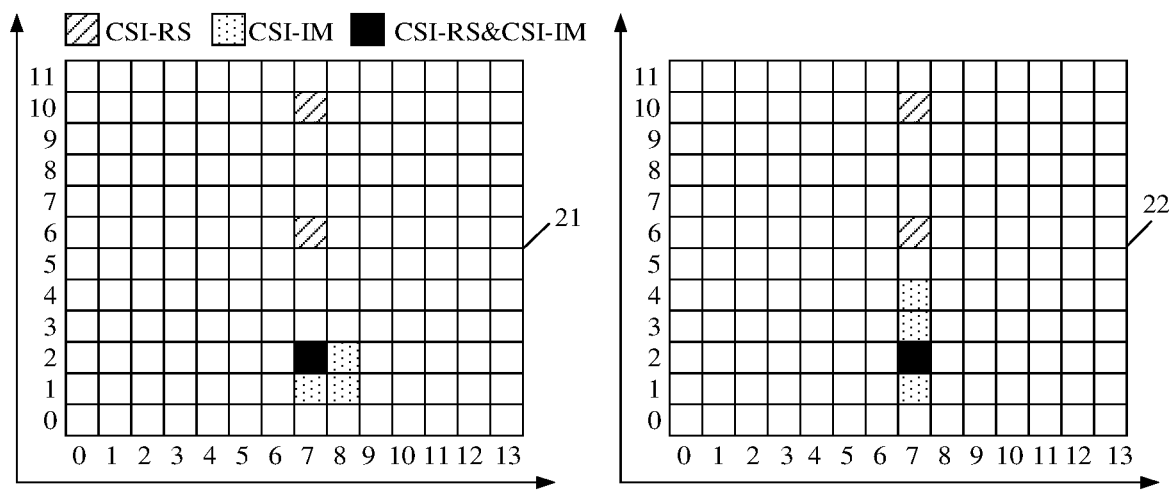
FIG. 2B is a second schematic diagram of an RE pattern according to an embodiment of this disclosure.
Figure 2C:
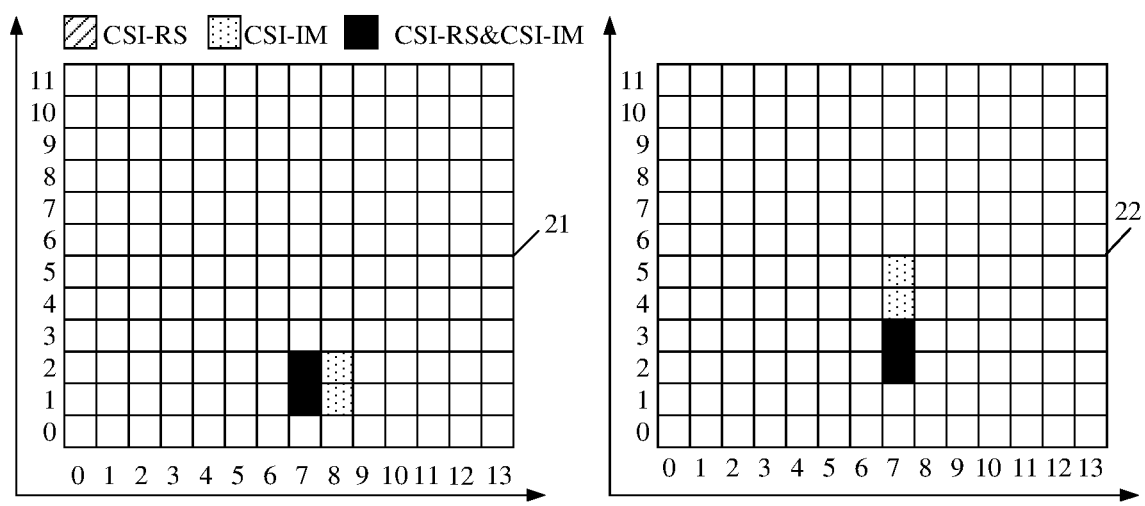
FIG. 2C is a third schematic diagram of an RE pattern according to an embodiment of this disclosure.

As shown in FIG. 2A to FIG. 2C, the first set of reference signal resources configured by the network device includes CSI-RS resource 1 and CSI-RS resource 2, located in a first resource block (RB) 21 and a second RB 22, respectively. The second set of reference signal resources configured by the network device includes CSI-IM resource 1 and CSI-IM resource 2, also located in the first RB 21 and the second RB 22, respectively. In the first RB 21, CSI-RS resource 1 and CSI-IM resource 1 overlap. In the second RB 22, CSI-RS resource 2 and CSI-IM resource 2 overlap.

It should be noted that in FIG. 2A to FIG. 2C, and also in the following FIG. 3A, FIG. 3B, FIG. 4A, FIG. 4B, FIG. 5A, and FIG. 5B, oblique-line boxes represent REs occupied by a CSI-RS resource, dotted boxes represent REs occupied by a CSI-IM resource, and black boxes represent overlapping REs occupied by overlapping CSI-RS resource and CSI-IM resource.

Optionally, referring to 2A, it can be learned that the first RB 21 and the second RB 22 each include one CSI-RS resource (CSI-RS resource 1 and CSI-RS resource 2 respectively), and one CSI-RS resource includes one port. In the first RB 21 and the second RB 22, density of RE units occupied by the CSI-RS resources is 3, indicating that three RE units are included in each of the first RB 21 and the second RB 22. One RE unit includes one RE, corresponding to the number of ports of the one CSI-RS resource. Referring to FIG. 2A again, it can be learned that the first RB 21 and the second RB 22 further include one CSI-IM resource (CSI-IM resource 1 and CSI-IM resource 2, respectively). One CSI-IM resource occupies four REs, and one of the four REs overlaps the one RE occupied by the CSI-RS resource.

FIG. 2B is a schematic diagram of a RE pattern in which REs of one CSI-RS resource and one CSI-IM resource overlap. A difference between FIG. 2B and FIG. 2A lies in that the REs of the CSI-IM resource have different positions while others are similar. Details are not repeated herein.

FIG. 2C is a schematic diagram of a RE pattern in which REs of one CSI-RS resource and one CSI-IM resource overlap. Referring to FIG. 2C, it can be learned that the first RB 21 and the second RB 22 each include one CSI-RS resource (CSI-RS resource 1 and CSI-RS resource 2 respectively), and one CSI-RS resource includes two ports. In the first RB 21 and the second RB 22, density of RE units occupied by the CSI-RS resources is 1, indicating that one RE unit is included in each of the first RB 21 and the second RB 22. One RE unit includes two REs, corresponding to the number of ports of the one CSI-RS resource. Referring to FIG. 2C again, it can be learned that the first RB 21 and the second RB 22 each include one CSI-IM resource (CSI-IM resource 1 and CSI-IM resource 2, respectively). One CSI-IM resource occupies four REs, and two of the four REs overlap the two REs occupied by the CSI-RS resource.

Based on the RE patterns shown in FIG. 2A to FIG. 2C, if the network device needs to measure signal quality of two beams (beam 1 and beam 2), CSI-RS resource 1 may be used for channel measurement for beam 1, and CSI-IM resource 2 may be used for interference measurement for beam 1, that is, CSI-RS resource 1 is associated with CSI-IM resource 2. CSI-RS resource 2 may be used for channel measurement for beam 2, and CSI-IM resource 1 may be used for interference measurement for beam 2, that is, CSI-RS resource 2 is associated with CSI-IM resource 1.

Further, during measurement on interference received by beam 1, only the reference signal carried by the CSI-IM resource 2 with overlapping REs with the CSI-RS resource 2 may be measured, for example, only the reference signal carried by the CSI-IM resource on the black RE in FIG. 2A to FIG. 2C is measured, so as to obtain interference of the beam 2 to the beam 1.

Further, during measurement on interference received by beam 2, only the reference signal carried by the CSI-IM resource 1 with overlapping REs with the CSI-RS resource 1 may be measured, so as to obtain interference of beam 1 to beam 2.

The signal quality of the beam may be denoted by a signal to interference plus noise ratio (SINR). However, it should be noted that the SINR in this embodiment of this disclosure is different from a SINR in the related art.

Still further, for beam 1, SINR1 of beam 1 may be obtained based on the measured channel and interference corresponding to CSI-RS resource 1. For beam 2, SINR2 of beam 2 may be obtained based on the measured channel and interference corresponding to CSI-RS resource 2.

Optionally, SINR1 may be equal to a ratio of RSRP1 to RSRP2, where RSRP1 is a reference signal received power (RSRP) of the reference signal carried by CSI-RS resource 1, and RSRP2 is an RSRP of the reference signal carried by CSI-IM resource 2 that overlaps CSI-RS resource 2.

In a second example, a case that a plurality of reference signal resource in the first set of reference signal resources overlap one reference signal resource in the second set of reference signal resources is described. For example, as shown in FIG. 3A and FIG. 3B, it is possible that REs of one CSI-IM resource overlap those of a plurality of CSI-RS resources.

Figure 3A:
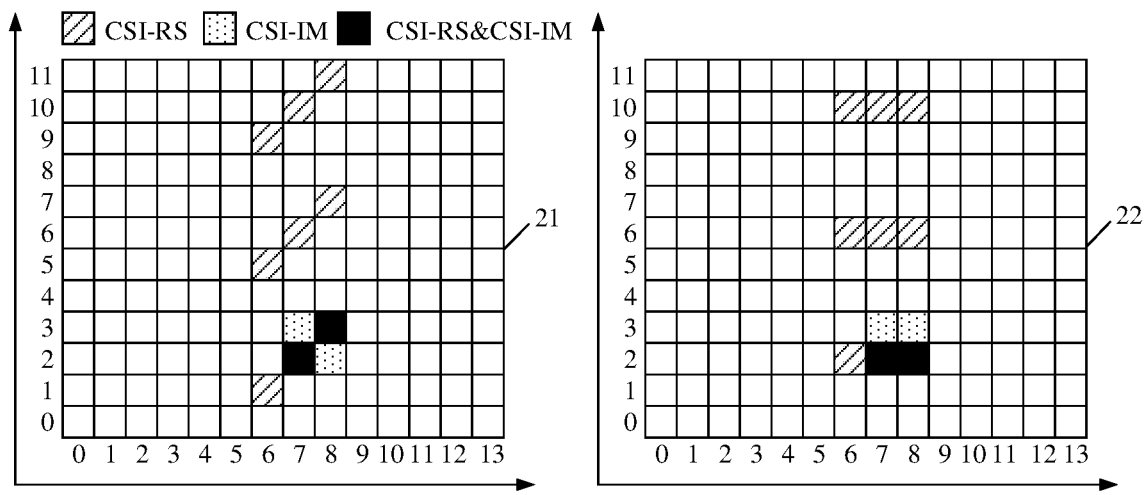
FIG. 3A is a first schematic diagram of another RE pattern according to an embodiment of this disclosure.

As shown in FIG. 3A, the first RB 21 and the second RB 22 each include three CSI-RS resources: CSI-RS resource 1, CSI-RS resource 2, and CSI-RS resource 3, each including one port. In the first RB 21 and the second RB 22, density of RE units occupied by the three CSI-RS resources is 3, indicating that three RE units are included in each CSI-RS resource of the first RB 21 and the second RB 22. One RE unit includes one RE, corresponding to the number of ports of the three CSI-RS resources. Referring to FIG. 3A again, it can be learned that the first RB 21 and the second RB 22 each further include one CSI-IM resource 1. CSI-IM resource 1 occupies four REs, and two of the four REs overlap one RE occupied by CSI-RS resource 2 and CSI-RS resource 3 respectively.

Figure 3B:
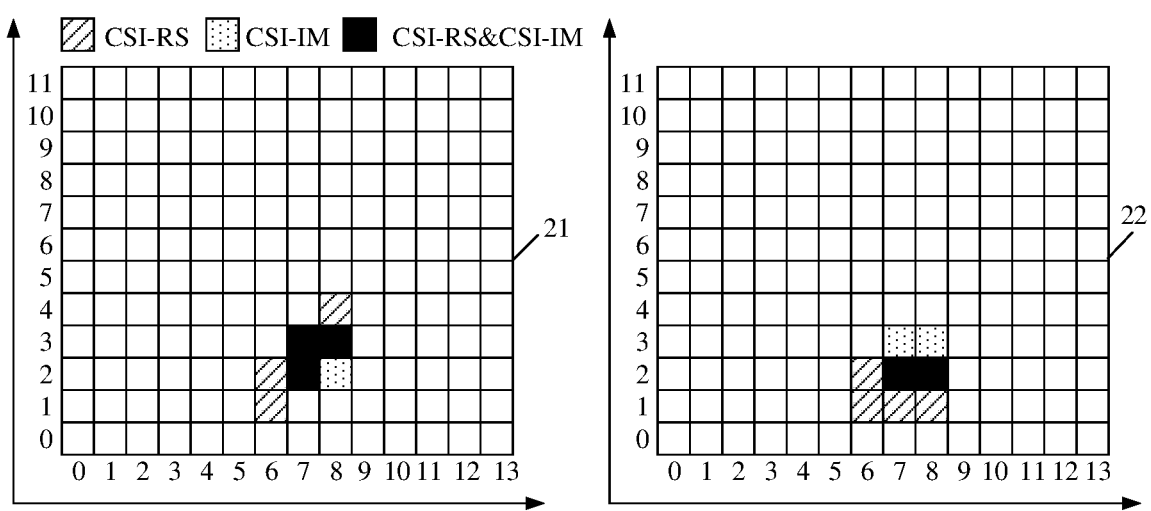
FIG. 3B is a second schematic diagram of another RE pattern according to an embodiment of this disclosure.

As shown in FIG. 3B, the first RB 21 and the second RB 22 each include three CSI-RS resources: CSI-RS resource 1, CSI-RS resource 2, and CSI-RS resource 3, each including two ports. In the first RB 21 and the second RB 22, density of RE units occupied by the three CSI-RS resources is 1, indicating that one RE unit is included in each CSI-RS resource of the first RB 21 and the second RB 22. One RE unit includes two REs, corresponding to the number of ports of the three CSI-RS resources. Referring to FIG. 3B again, it can be learned that the first RB 21 and the second RB 22 each further include one CSI-IM resource 1. CSI-IM resource 1 occupies four REs, and more than one of the four REs each overlap part or all of REs occupied by CSI-RS resource 2 and CSI-RS resource 3.

Based on the RE patterns shown in FIG. 3A and FIG. 3B, if the network device needs to measure signal quality of three beams (beam 1, beam 2, and beam 3), CSI-RS resource 1 may be used for channel measurement for beam 1, and CSI-IM resource 1 may be used for interference measurement for beam 1, that is, interference from beam 2 and beam 3 can be obtained through measurement, because CSI-IM resource 1 overlap two CSI-RS resources, namely CSI-RS resource 2 and CSI-RS resource 3.

Further, during measurement on interference received by beam 1, only the reference signal carried by the CSI-IM resource 1 with overlapping REs with the CSI-RS resource 2 and CSI-RS resource 3 may be measured, for example, only the reference signal carried by the CSI-IM resource on the black RE in the first RB 21 in FIG. 3A and FIG. 3B is measured.

Still further, for beam 1, SINR1 of beam 1 may be obtained based on the measured channel and interference corresponding to CSI-RS resource 1. Optionally, SINR1 may be equal to a ratio of RSRP1 to RSRP3, where RSRP1 is an RSRP of the reference signal carried by CSI-RS resource 1, and RSRP3 is an RSRP of the reference signal carried by CSI-IM resource 1 that overlaps CSI-RS resource 2 and CSI-RS resource 3.

In the first and second examples described above, the reference signal resources in the second set of reference signal resources and the reference signal resources in the first set of reference signal resources partially or completely overlap. During interference measurement on one beam, only a reference signal carried by a reference signal resource, overlapping a reference signal resource in the first set of reference signal resources, in the second set of reference signal resources is measured.

Therefore, optionally, in the third example, the resource position occupied by the second reference signal resource may be a subset of a resource position occupied by at least one third reference signal resource; or the resource position occupied by the second reference signal resource and the resource position occupied by the at least one third reference signal resource completely overlap, where the resource position includes at least one of a time domain position or a frequency domain position. To be specific, a new RE pattern of the second reference signal resource (CSI-IM resource) can be designed, so that the RE pattern of the second reference signal resource (CSI-IM resource) becomes a subset of an RE pattern of the third reference signal resource (CSI-RS resource), or the RE pattern of the second reference signal resource (CSI-IM resource) is the same as the RE pattern of the third reference signal resource (CSI-RS resource).

For example, the designed RE pattern of the second reference signal resource is a target pattern, and all REs in the target pattern and some REs in the RE pattern of the at least one third reference signal resource overlap; or all REs in the target pattern and all REs in the RE pattern of the at least one third reference signal resource completely overlap.

Figure 4A:
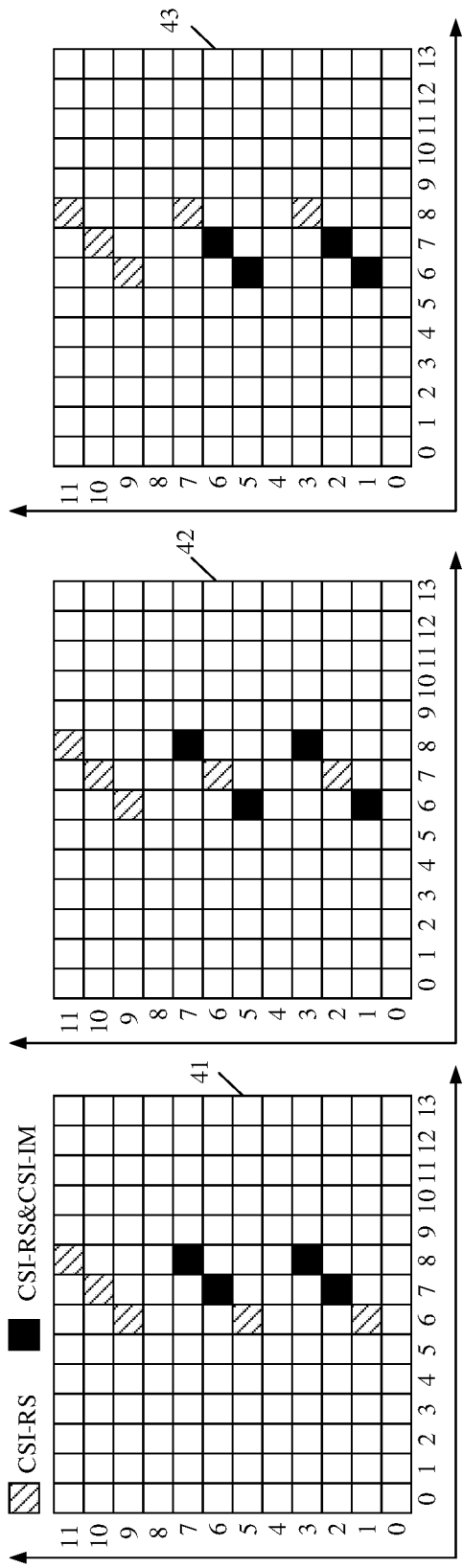
FIG. 4A is a first schematic diagram of another RE pattern according to an embodiment of this disclosure.
Figure 4B:
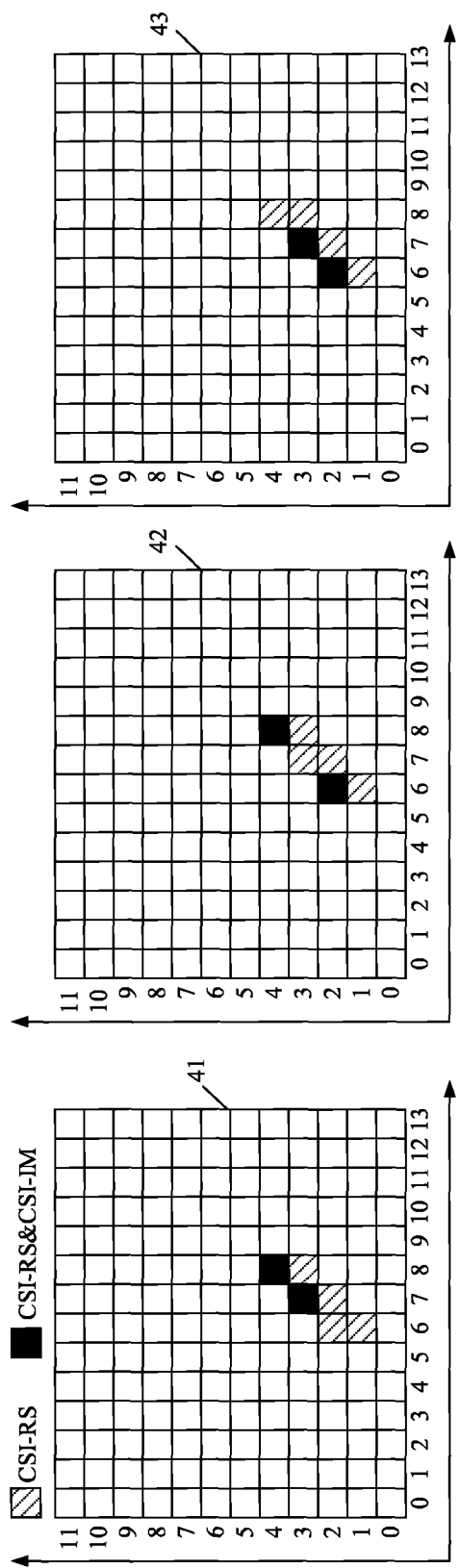
FIG. 4B is a second schematic diagram of another RE pattern according to an embodiment of this disclosure.

FIG. 4A and FIG. 4B show a case that the RE pattern of the CSI-IM resource is a subset of the RE pattern of the CSI-RS resource.

As shown in FIG. 4A, a third RB 41, a fourth RB 42, and a fifth RB 43 each include three CSI-RS resources: CSI-RS resource 1, CSI-RS resource 2 and CSI-RS resource 3. The three CSI-RS resources each include one port, and in the third RB 41, the fourth RB 42, and the fifth RB 43, density of RE units occupied by the three CSI-RS resources is 3, indicating that the third RB 41, the fourth RB 42 and the fifth RB 43 each occupy three RE units. One RE unit includes one RE, corresponding to the number of ports of the three CSI-RS resources. Referring to FIG. 4A again, it can be learned that the third RB 41, the fourth RB 42, and the fifth RB 43 each further include two CSI-IM resources: CSI-IM resource 1 and CSI-IM resource 2. Each CSI-IM resource occupies two REs, and the two REs overlap two REs occupied by one CSI-RS resource.

FIG. 4B is similar to FIG. 4A, all REs occupied by one CSI-IM resource and some REs of one CSI-RS resource completely overlap. For brevity, details are not described herein.

Figure 5A:
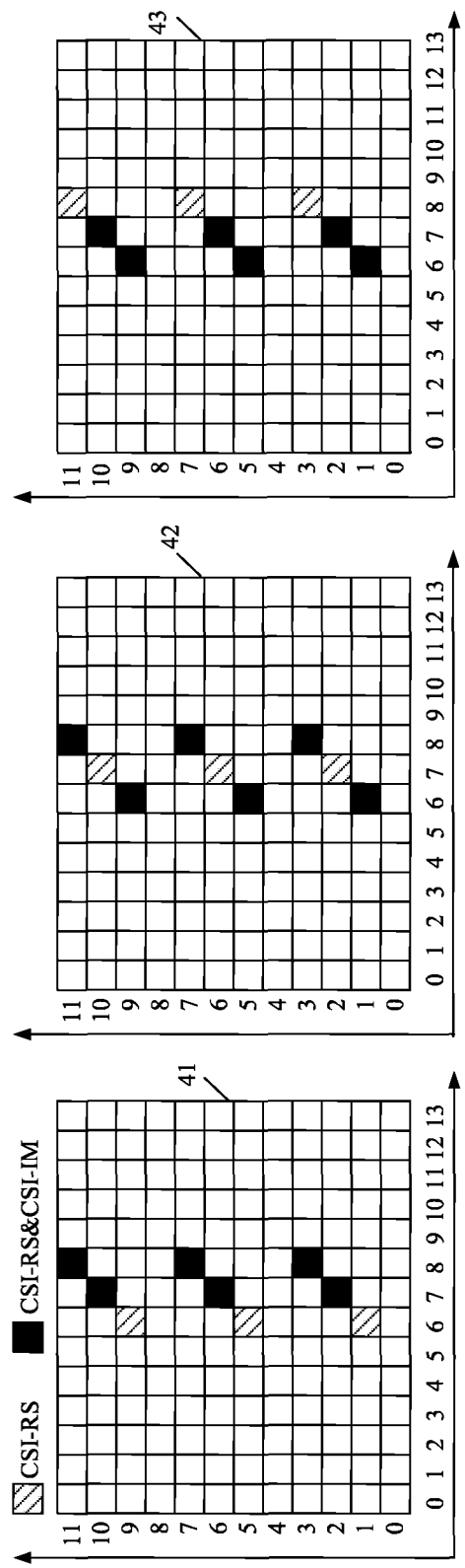
FIG. 5A is a first schematic diagram of another RE pattern according to an embodiment of this disclosure.
Figure 5B:
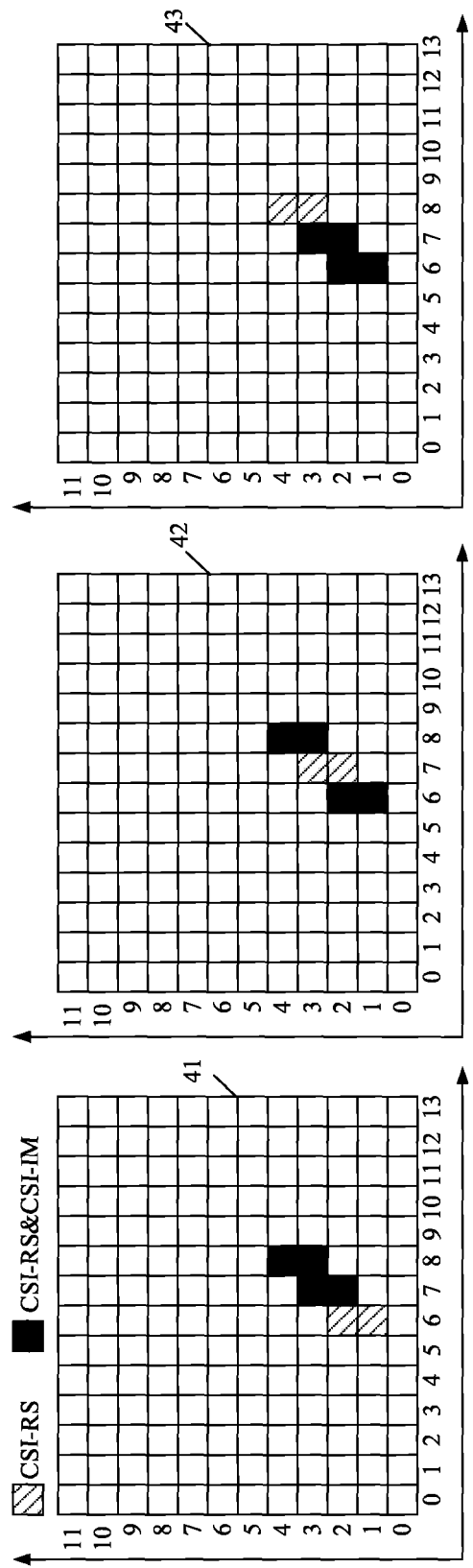
FIG. 5B is a second schematic diagram of another RE pattern according to an embodiment of this disclosure.

FIG. 5A and FIG. 5B show a case that the RE pattern of the CSI-IM resource is completely the same as the RE pattern of the CSI-RS resource.

As shown in FIG. 5A, a third RB 41, a fourth RB 42, and a fifth RB 43 each include three CSI-RS resources: CSI-RS resource 1, CSI-RS resource 2 and CSI-RS resource 3. The three CSI-RS resources each include one port, and in the third RB 41, the fourth RB 42, and the fifth RB 43, density of RE units occupied by the three CSI-RS resources is 3, indicating that the third RB 41, the fourth RB 42 and the fifth RB 43 each occupy three RE units. One RE unit includes one RE, corresponding to the number of ports of the three CSI-RS resources. Referring to FIG. 5A again, it can be learned that the third RB 41, the fourth RB 42, and the fifth RB 43 each further include two CSI-IM resources: CSI-IM resource 1 and CSI-IM resource 2. Each CSI-IM resource occupies three REs, and the three REs overlap three REs occupied by one CSI-RS resource.

FIG. 5B is similar to FIG. 5A, all REs occupied by one CSI-IM resource and all REs of one CSI-RS resource completely overlap. For brevity, details are not described herein.

It is easy to understand that, in the third example, the second reference signal resource has no RE not overlapping that of the third reference signal resource. In this way, when only the reference signal carried by the second reference signal resource is measured on a resource position overlapping the third reference signal resource, there is no waste of the second reference signal resource. Correspondingly, the reference signal used for interference measurement is measured on the reference signal resource used for channel measurement, thereby reducing resource overheads.

In addition, in the method for measuring a reference signal in this embodiment of this disclosure, when the configured reference signal resource for measuring the channel overlaps the reference signal resource for measuring the interference, Optionally, the reference signal carried by the reference signal resource for measuring interference is measured on the resource position corresponding to the reference signal resource for measuring the channel, making the reference signal resource for measuring interference clearer. Therefore, accuracy of inter-beam interference measurement during beam measurement can be improved, and the network device can select an ideal beam for sending a signal or channel to the terminal device, improving the throughput and reducing a block error rate.

In the following three specific implementations, the process of determining the second set of reference signal resources by the terminal device based on the second configuration information from the network device in step 101 is described in detail.

First Specific Implementation

In a case that the reference signal resources in the second set of reference signal resources overlapping the reference signal resources in the first set of reference signal resources is any one case in the first to third examples, the second configuration information configured by the network device may explicitly include the resource position information of the reference signal resources in the second set of reference signal resources. For example, the second configuration information may include a first parameter and a second parameter, where a value of the first parameter may be frequency domain position information of the reference signal resources in the second set of reference signal resources, and a value of the second parameter may be time domain position information of the reference signal resources in the second set of reference signal resources.

On this basis, the determining the second set of reference signal resources based on second configuration information that is sent from the network device and used for configuring the second set of reference signal resources may include: determining resource positions corresponding to the resource position information as resource positions of the reference signal resources in the second set of reference signal resources.

Second Specific Implementation

In a case that the reference signal resources in the second set of reference signal resources overlapping the reference signal resources in the first set of reference signal resources is any one case in the third example, the second configuration information configured by the network device may include the index information of the reference signal resources in the first set of reference signal resources. That is, the network device may indicate the position information of the CSI-IM resource by means of indicating the index information of the CSI-RS resource. For example, if a value of a parameter in the configuration information of the CSI-IM resource is set to index information of CSI-RS resource 1, it indicates that the resource position of the CSI-IM resource is the resource position of CSI-RS resource 1.

On this basis, the determining the second set of reference signal resources based on second configuration information that is sent from the network device and used for configuring the second set of reference signal resources may include: determining resource positions of the reference signal resources corresponding to the index information as resource positions of the reference signal resources in the second set of reference signal resources.

Third Specific Implementation

In a case that the reference signal resources in the second set of reference signal resources overlapping the reference signal resources in the first set of reference signal resources is any one case in the third example, the second configuration information configured by the network device may include index information of a RE subset of the reference signal resources in the first set of reference signal resources. That is, the network device may divide the third reference signal resources in the first set of reference signal resources into a plurality of RE subsets in advance, and then indicate, in the second configuration information, index information of a RE subset of the third reference signal resource, so as to indicate the resource positions of the reference signal resources in the second set of reference signal resources. For example, the network device may divide CSI-RS resource 1 into a plurality of RE subsets in advance, and then indicate, in the CSI-IM configuration information, index information of the RE subsets of the CSI-RS resource to indicate position information of the CSI-IM resource.

On this basis, the determining the second set of reference signal resources based on second configuration information that is sent from the network device and used for configuring the second set of reference signal resources may include: determining a RE subset corresponding to the index information as the reference signal resources in the second set of reference signal resources.

Figure 6:
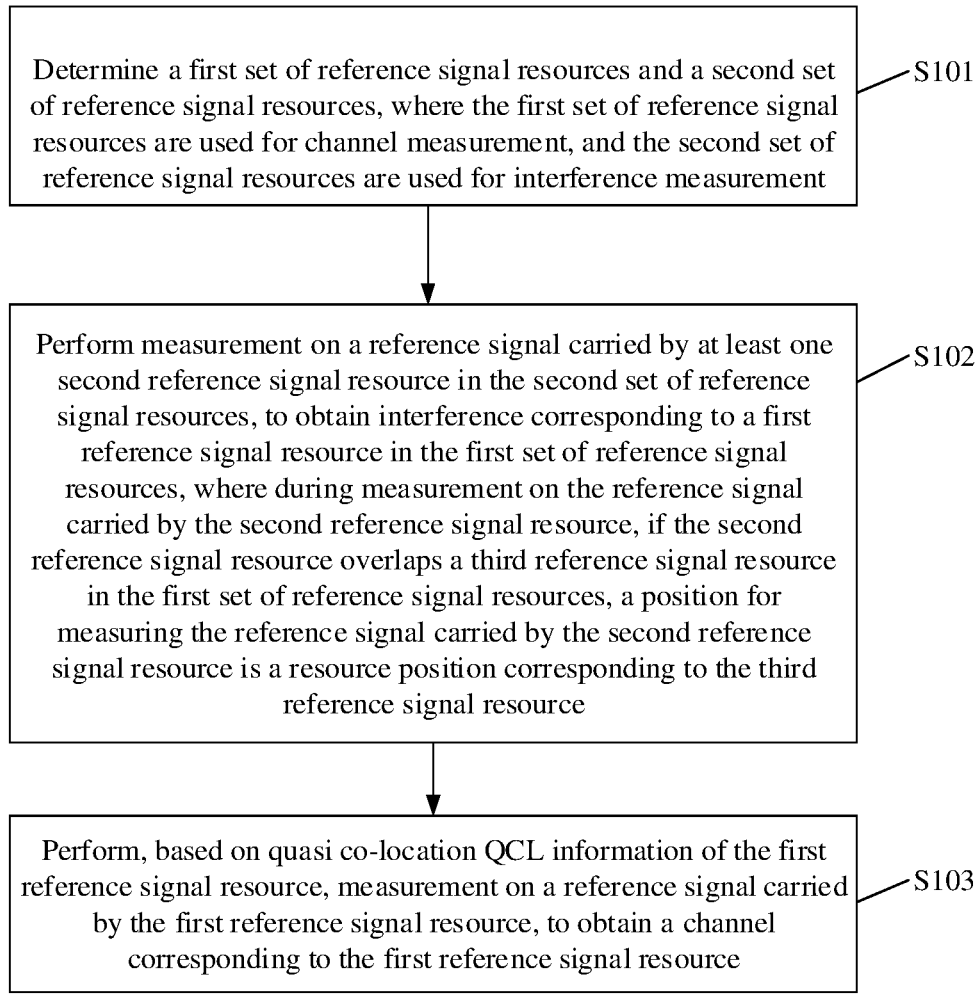
FIG. 6 is a second schematic flowchart of a method for measuring a reference signal according to an embodiment of this disclosure.

Optionally, as shown in FIG. 6, on the basis of FIG. 1, the method for measuring a reference signal in this embodiment of the present invention may further include:

Step 103: Perform, based on QCL information of the first reference signal resource, measurement on a reference signal carried by the first reference signal resource, to obtain a channel corresponding to the first reference signal resource.

Optionally, step 103 may include: determining, based on the QCL information of the first reference signal resource, a reception parameter used for receiving the reference signal carried by the first reference signal resource; receiving, based on the reception parameter, the reference signal carried by the first reference signal resource; and determining, based on a received power of the reference signal carried by the first reference signal resource, the channel corresponding to the first reference signal resource.

For example, the terminal device may first determine the reception parameter of CSI-RS resource 1 based on the QCL information of CSI-RS resource 1, and then receive, based on the reception parameter, the reference signal carried by CSI-RS resource 1, and use an RSRP of the reference signal carried by CSI-RS resource 1 as the channel corresponding to CSI-RS resource 1.

Correspondingly, the foregoing step 102 may Optionally include: performing, based on the QCL information of the first reference signal resource, measurement on the reference signal carried by the at least one second reference signal resource, to obtain the interference corresponding to the first reference signal resource.

Optionally, the terminal device may first determine, based on the QCL information of the first reference signal resource, a reception parameter used for receiving the reference signal carried by the at least one second reference signal resource; receiving, based on the reception parameter, the reference signal carried by the at least one second reference signal resource; and determining, based on a received power of the reference signal carried by the at least one second reference signal resource, the interference corresponding to the first reference signal resource.

For example, the terminal device may first determine, based on the QCL information of CSI-RS resource 1, a reception parameter used for receiving at least one CSI-IM resource associated with CSI-RS resource 1, receive, based on the reception parameter, a reference signal carried by the at least one CSI-IM resource associated with CSI-RS resource 1, and use an RSRP of the reference signal carried by the at least one CSI-IM resource as the interference corresponding to CSI-RS resource 1.

Figure 7:
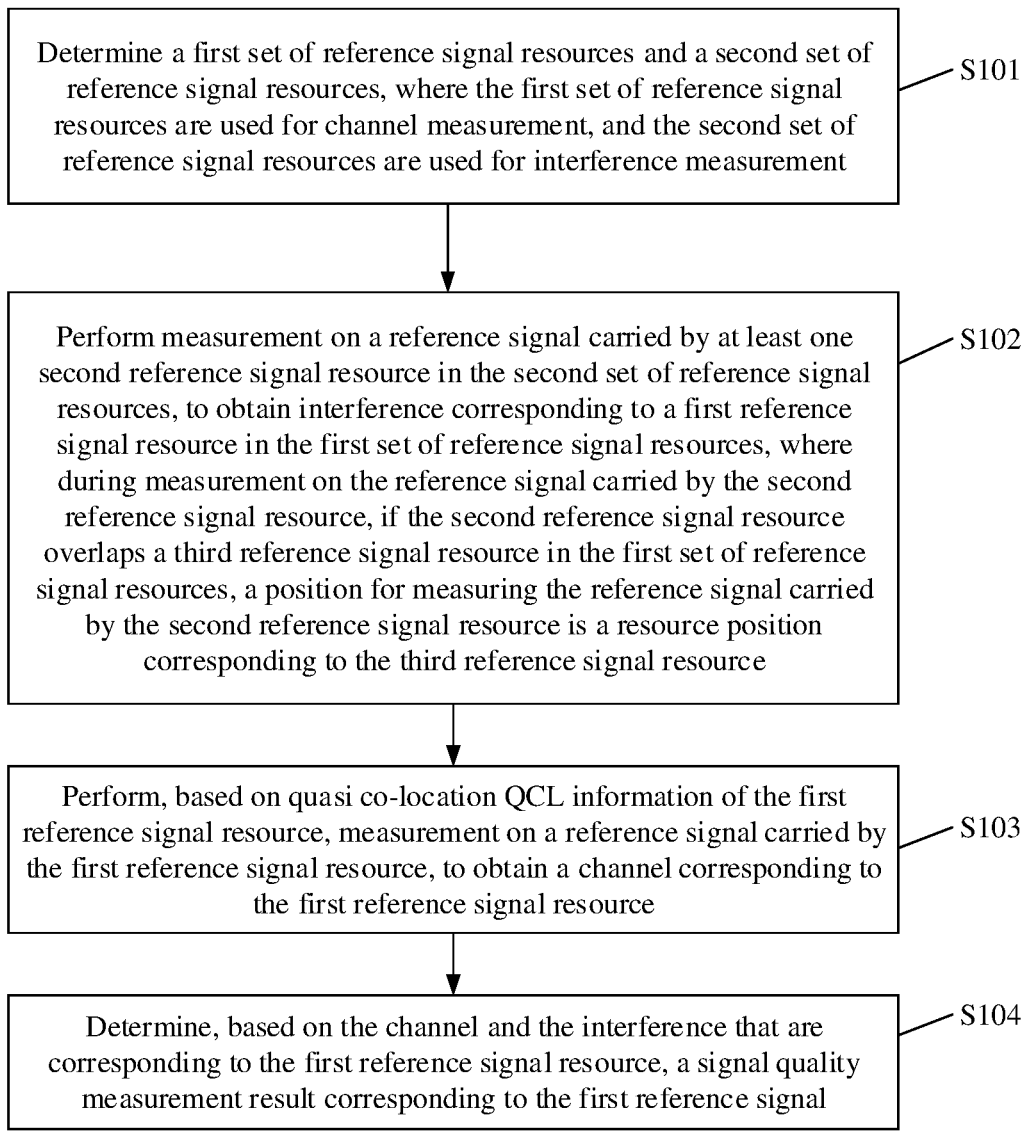
FIG. 7 is a third schematic flowchart of a method for measuring a reference signal according to an embodiment of this disclosure.

Optionally, as shown in FIG. 7, after the interference corresponding to the first reference signal resource is obtained, the method for measuring a reference signal in this embodiment of the present invention may further include:

Step 104: Determine, based on the channel and the interference that are corresponding to the first reference signal resource, a signal quality measurement result corresponding to the first reference signal.

Optionally, a ratio of the channel corresponding to the first reference signal resource to the interference corresponding to the first reference signal resource may be determined as the signal quality measurement result (the SINR described above) corresponding to the first reference signal resource.

In this way, when the first reference signal resource is CSI-RS resource 1 transmitted by the network device by using a transmit beam 1, the measured SINR corresponding to the CSI-RS resource 1 may be used as a measurement result of the transmit beam 1.

The embodiment shown in FIG. 7 provides a method for measuring a reference signal. The signal quality measurement result corresponding to the first reference signal resource can be further determined based on the interference with higher accuracy, so as to obtain a measurement result better reflecting signal quality of the beam corresponding to the first reference signal resource. In this way, the network device can determine, based on the measurement result, an ideal beam for sending a signal or channel to the terminal device, improving the throughput and reducing a block error rate.

Optionally, after the terminal device obtains, through measurement, the signal quality measurement results corresponding to a plurality of first reference signal resources in the first set of reference signal resources, the method for measuring a reference signal provided in this embodiment of the present invention may further include: selecting, from the first set of reference signal resources, at least one first reference signal resource whose signal quality measurement result parameter satisfies a preset condition; and reporting at least one of an index, a signal quality measurement result, or a channel that are of the at least one first reference signal resource that is selected.

In an example, at least one first reference signal resource whose SINR is greater than or equal to a preset threshold may be selected from the first set of reference signal resources; or the at least one first reference signal resource is sorted in descending order of SINRs, and at least one first reference signal resource in the front of the sorted list is selected.

For example, M first reference signal resources are selected from N first reference signal resources in any one of the foregoing manners. Then, SINRs of the M first reference signal resources, indexes of the M first reference signal resources, and other information related to the SINRs corresponding to the M first reference signal resources are reported to the network device, so that the network device determines an ideal beam for transmitting a signal or channel to the terminal device.

The foregoing describes the method for measuring a reference signal applied to the terminal device. The following describes a method for configuring a reference signal resource applied to a network device in an embodiment of this disclosure with reference to FIG. 8.

As shown in FIG. 8, an embodiment of this disclosure provides a method for configuring a reference signal resource applied to a network device. The method may include the following steps.

Step 801: Send first configuration information and second configuration information.

The first configuration information is used for determining a first set of reference signal resources by a terminal device, and the first set of reference signal resources are used for channel measurement; the second configuration information is used for determining a second set of reference signal resources by the terminal device, and the second set of reference signal resources are used for interference measurement; interference corresponding to a first reference signal resource in the first set of reference signal resources is obtained through measurement on a reference signal carried by at least one second reference signal resource in the second set of reference signal resources; and during measurement on the reference signal carried by the second reference signal resource, if the second reference signal resource overlaps a third reference signal resource in the first set of reference signal resources, a position for measuring the reference signal carried by the second reference signal resource is a resource position corresponding to the third reference signal resource.

The first configuration information and the second configuration information may be RRC information or other higher-layer information.

The first set of reference signal resources may include two or more reference signal resources. Optionally, the first set of reference signal resources may be SSB resources or CSI-RS resources. Still further, the first set of reference signal resources may be CSI-RS resources, because a CSI-RS-based channel measurement manner is finer than an SSB-based channel measurement manner, a channel obtained through measurement may be more accurate, good for multi-beam and multi-user scheduling on a network side.

Optionally, the first configuration information may further include information such as QCL information of the reference signal resources in the first set of reference signal resources and a value of a repetition parameter (repetition) of the first set of reference signal resources.

The second set of reference signal resources may alternatively include one or more reference signal resources. Optionally, the second set of reference signal resources may be CSI-IM resources.

Optionally, the first reference signal resource has an association relationship with the at least one second reference signal resource. The at least one second reference signal resource associated with one first reference signal resource may be partially or completely the same as the at least one second reference signal resource associated with another first reference signal resource. The second reference signal resource having an association relationship with the first reference signal resource may be used to measure the interference corresponding to the first reference signal resource.

Optionally, at least one reference signal resource in the first set of reference signal resources may overlap at least one reference signal resource in the second set of reference signal resources. For example, if one or more third reference signal resources are included in the first set of reference signal resources, one second reference signal resource and one third reference signal resource may partially or completely overlap, or one second reference signal resource may overlap a plurality of third reference signal resources. In addition, because a plurality of second reference signal resources may be included in the second set of reference signal resources, it may also be possible that a plurality of second reference signal resources and one third reference signal resource partially or completely overlap. The following uses an example for description.

In a first example, one reference signal resource in the first set of reference signal resources overlaps one reference signal resource in the second set of reference signal resources. For example, as shown in FIG. 2A to FIG. 2C, it is possible that REs in a resource element pattern (RE pattern) of one CSI-IM resource overlap those of one CSI-RS resource.

In a second example, a plurality of reference signal resource in the first set of reference signal resources overlap one reference signal resource in the second set of reference signal resources. For example, as shown in FIG. 3A and FIG. 3B, it is possible that REs of one CSI-IM resource overlap those of a plurality of CSI-RS resources.

In the first and second examples described above, the reference signal resources in the second set of reference signal resources and the reference signal resources in the first set of reference signal resources partially or completely overlap. When UE performs interference measurement on one beam, only a reference signal carried by a reference signal resource, overlapping a reference signal resource in the first set of reference signal resources, in the second set of reference signal resources is measured, leaving non-overlapping reference signal resources in the second set of reference signal resources unused, thereby resulting in a waste of the second set of reference signal resources.

Therefore, optionally, in the third example, the resource position occupied by the second reference signal resource may be a subset of a resource position occupied by at least one third reference signal resource; or the resource position occupied by the second reference signal resource and the resource position occupied by the at least one third reference signal resource completely overlap, where the resource position includes at least one of a time domain position or a frequency domain position. To be specific, a new RE pattern of the second reference signal resource (CSI-IM resource) can be designed, so that the RE pattern of the second reference signal resource (CSI-IM resource) becomes a subset of an RE pattern of the third reference signal resource (CSI-RS resource), or the RE pattern of the second reference signal resource (CSI-IM resource) is the same as the RE pattern of the third reference signal resource (CSI-RS resource).

For example, the designed RE pattern of the second reference signal resource is a target pattern, and all REs in the target pattern and some REs in the RE pattern of the at least one third reference signal resource overlap; or all REs in the target pattern and all REs in the RE pattern of the at least one third reference signal resource completely overlap.

FIG. 4A and FIG. 4B show a case that the RE pattern of the CSI-IM resource is a subset of the RE pattern of the CSI-RS resource. FIG. 5A and FIG. 5B show a case that the RE pattern of the CSI-IM resource is completely the same as the RE pattern of the CSI-RS resource. For specific overlapping cases, refer to the foregoing description. Details are not described herein again.

It is easy to understand that, compared to the first and second examples, in the third example, the second reference signal resource has no RE not overlapping that of the third reference signal resource. In this way, when only the reference signal carried by the second reference signal resource is measured on a resource position overlapping the third reference signal resource, there is no waste of the second reference signal resource. Correspondingly, the reference signal used for interference measurement is measured on the reference signal resource used for channel measurement, thereby reducing resource overheads.

In addition, in the method for configuring a reference signal resource in this embodiment of this disclosure, when the configured reference signal resource for measuring the channel overlaps the reference signal resource for measuring the interference, Optionally, the reference signal carried by the reference signal resource for measuring interference is measured by the UE on the resource position corresponding to the reference signal resource for measuring the channel, making the reference signal resource for measuring interference clearer. Therefore, accuracy of inter-beam interference measurement during beam measurement can be improved, and the network device can select an ideal beam for sending a signal or channel to the terminal device, improving the throughput and reducing a block error rate.

In the following three specific implementations, the process of configuring the second set of reference signal resources for the terminal device by the network device by using the second configuration information in step 801 is described in detail.

First Specific Implementation

In a case that the reference signal resources in the second set of reference signal resources overlapping the reference signal resources in the first set of reference signal resources is any one case in the first to third examples, the second configuration information configured by the network device may explicitly include the resource position information of the reference signal resources in the second set of reference signal resources. For example, the second configuration information may include a first parameter and a second parameter, where a value of the first parameter may be frequency domain position information of the reference signal resources in the second set of reference signal resources, and a value of the second parameter may be time domain position information of the reference signal resources in the second set of reference signal resources.

Second Specific Implementation

In a case that the reference signal resources in the second set of reference signal resources overlapping the reference signal resources in the first set of reference signal resources is the case described in the third example, the second configuration information configured by the network device may include the index information of the reference signal resources in the first set of reference signal resources, and resource positions of the reference signal resources corresponding to the index information are the resource positions of the reference signal resources in the second set of reference signal resources. That is, the network device may indicate the position information of the CSI-IM resource by means of indicating the index information of the CSI-RS resource.

Third Specific Implementation

In a case that the reference signal resources in the second set of reference signal resources overlapping the reference signal resources in the first set of reference signal resources is the case described in the third example, the second configuration information configured by the network device may include index information of a RE subset of the reference signal resources in the first set of reference signal resources, and a RE subset corresponding to the index information is the reference signal resources in the second set of reference signal resources. That is, the network device may divide the third reference signal resources in the first set of reference signal resources into a plurality of RE subsets in advance, and then indicate, in the second configuration information, index information of a RE subset of the third reference signal resource, so as to indicate the resource positions of the reference signal resources in the second set of reference signal resources.

Optionally, the method for configuring a reference signal resource shown in FIG. 8 may further include: receiving at least one of an index, a signal quality measurement result, or a channel that are of the at least one first reference signal resource and reported by the terminal device.

The at least one first reference signal resource reported by the terminal device is the first reference signal resource whose signal quality measurement result satisfies a preset condition in the first set of reference signal resources, and the signal quality measurement result of the first reference signal resource is determined based on the channel and interference that are corresponding to the first reference signal resource.

For example, SINRs of the M fourth reference signal resources, indexes of the M fourth reference signal resources, and other information related to the SINRs corresponding to the M fourth reference signal resources that are reported by the terminal device are received, and then an ideal beam for transmitting a signal or channel to the terminal device is determined based on the reported information that is received.

The foregoing describes the method for configuring a reference signal resource applied to the network device. This method corresponds to the foregoing method for measuring a reference signal applied to the terminal device; therefore, the description is relatively brief. For related details, refer to the description of the foregoing method for measuring a reference signal applied to the terminal device.

The following describes the terminal device and the network device in the embodiments of this disclosure in detail with reference to FIG. 9 to FIG. 12.

FIG. 9 is a schematic structural diagram of a terminal device according to an embodiment of this disclosure. As shown in FIG. 9, the terminal device 900 includes: a first determining module 901 and a first measurement module 902.

The first determining module 901 is configured to determine a first set of reference signal resources and a second set of reference signal resources, where the first set of reference signal resources are used for channel measurement, and the second set of reference signal resources are used for interference measurement.

Optionally, the first determining module 901 may be configured to determine the first set of reference signal resources based on first configuration information that is sent from a network device and used for configuring the first set of reference signal resources; and determine the second set of reference signal resources based on second configuration information that is sent from the network device and used for configuring the second set of reference signal resources.

The first set of reference signal resources may include two or more reference signal resources, and the reference signal resources included in the first set of reference signal resources may include, but are not limited to, SSB resources or CSI-RS resources.

Optionally, the reference signal resources included in the first set of reference signal resources may be CSI-RS resources, because a CSI-RS-based channel measurement manner is finer than an SSB-based channel measurement manner, a channel obtained through measurement may be more accurate, good for multi-beam and multi-user scheduling on a network side.

Optionally, the first configuration information may further include information such as QCL information of the reference signal resources in the first set of reference signal resources and a value of a repetition parameter (repetition) of the first set of reference signal resources.

The second set of reference signal resources may further include one or more reference signal resources, and the reference signal resources included in the second set of reference signal resources may include, but are not limited to, at least one of CSI-IM resource, IMR, or NZP CSI-RS resource. Optionally, the reference signal resources included in the second set of reference signal resources are CSI-IM resources.

The first measurement module 902 is configured to perform measurement on a reference signal carried by at least one second reference signal resource in the second set of reference signal resources, to obtain interference corresponding to a first reference signal resource in the first set of reference signal resources, where during measurement on the reference signal carried by the second reference signal resource, if the second reference signal resource overlaps a third reference signal resource in the first set of reference signal resources, a position for measuring the reference signal carried by the second reference signal resource is a resource position corresponding to the third reference signal resource.

Optionally, the first measurement module 902 may be configured to: in a case that the second reference signal resource overlaps the third reference signal resource in the first set of reference signal resources, perform, on the resource position overlapping the third reference signal resource, measurement on the reference signal carried by the second reference signal.

Optionally, at least one first reference signal resource in the first set of reference signal resources may have an association relationship with at least one second reference signal resource in the second set of reference signal resources, and the second reference signal resource having an association relationship with first reference signal resource may be used for interference measurement corresponding to the first reference signal resource.

Further, the at least one second reference signal resource associated with one first reference signal resource may be partially or completely the same as the at least one second reference signal resource associated with another first reference signal resource.

In actual application, at least one reference signal resource in the first set of reference signal resources may overlap at least one reference signal resource in the second set of reference signal resources. For example, if one or more third reference signal resources are included in the first set of reference signal resources, one second reference signal resource and one third reference signal resource may partially or completely overlap, or one second reference signal resource may overlap a plurality of third reference signal resources. In addition, because a plurality of second reference signal resources may be included in the second set of reference signal resources, it may also be possible that a plurality of second reference signal resources and one third reference signal resource partially or completely overlap. The following uses an example for description.

In a first example, one reference signal resource in the first set of reference signal resources overlaps one reference signal resource in the second set of reference signal resources. For example, as shown in FIG. 2A to FIG. 2C, it is possible that REs in a RE pattern of one CSI-IM resource overlap those of one CSI-RS resource.

In a second example, a plurality of reference signal resource in the first set of reference signal resources overlap one reference signal resource in the second set of reference signal resources. For example, as shown in FIG. 3A and FIG. 3B, it is possible that REs of one CSI-IM resource overlap those of a plurality of CSI-RS resources.

In the first and second examples described above, the reference signal resources in the second set of reference signal resources and the reference signal resources in the first set of reference signal resources partially or completely overlap. During interference measurement on one beam, only a reference signal carried by a reference signal resource, overlapping a reference signal resource in the first set of reference signal resources, in the second set of reference signal resources is measured, and non-overlapping reference signal resources in the second set of reference signal resources are not used, thereby resulting in a waste of the second set of reference signal resources.

Therefore, optionally, in the third example, the resource position occupied by the second reference signal resource may be a subset of a resource position occupied by at least one third reference signal resource; or the resource position occupied by the second reference signal resource and the resource position occupied by the at least one third reference signal resource completely overlap, where the resource position includes at least one of a time domain position or a frequency domain position. To be specific, a new RE pattern of the second reference signal resource (CSI-IM resource) can be designed, so that the RE pattern of the second reference signal resource (CSI-IM resource) becomes a subset of an RE pattern of the third reference signal resource (CSI-RS resource), or the RE pattern of the second reference signal resource (CSI-IM resource) is the same as the RE pattern of the third reference signal resource (CSI-RS resource).

For example, the designed RE pattern of the second reference signal resource is a target pattern, and all REs in the target pattern and some REs in the RE pattern of the at least one third reference signal resource overlap; or all REs in the target pattern and all REs in the RE pattern of the at least one third reference signal resource completely overlap.

FIG. 4A and FIG. 4B show a case that the RE pattern of the CSI-IM resource is a subset of the RE pattern of the CSI-RS resource. FIG. 5A and FIG. 5B show a case that the RE pattern of the CSI-IM resource is completely the same as the RE pattern of the CSI-RS resource.

It is easy to understand that, compared to the first and second examples, in the third example, the second reference signal resource has no RE not overlapping that of the third reference signal resource. In this way, when only the reference signal carried by the second reference signal resource is measured on a resource position overlapping the third reference signal resource, there is no waste of the second reference signal resource. Correspondingly, the reference signal used for interference measurement is measured on the reference signal resource used for channel measurement, thereby reducing resource overheads.

In addition, according to the terminal device 900 in this embodiment of this disclosure, when the configured reference signal resource for measuring the channel overlaps the reference signal resource for measuring the interference, Optionally, the reference signal carried by the reference signal resource for measuring interference is measured on the resource position corresponding to the reference signal resource for measuring the channel, making the reference signal resource for measuring interference clearer. Therefore, accuracy of inter-beam interference measurement during beam measurement can be improved, and the network device can select an ideal beam for sending a signal or channel to the terminal device, improving the throughput and reducing a block error rate.

In the following three specific implementations, the process of determining the second set of reference signal resources by the first determining module 901 based on the second configuration information from the network device is described in detail.

First Specific Implementation

In a case that the reference signal resources in the second set of reference signal resources overlapping the reference signal resources in the first set of reference signal resources is any one case in the first to third examples, the second configuration information configured by the network device may explicitly include the resource position information of the reference signal resources in the second set of reference signal resources.

On this basis, the first determining module 901 may be configured to determine resource positions corresponding to the resource position information in the second configuration information as resource positions of the reference signal resources in the second set of reference signal resources.

Second Specific Implementation

In a case that the reference signal resources in the second set of reference signal resources overlapping the reference signal resources in the first set of reference signal resources is any one case in the third example, the second configuration information configured by the network device may include the index information of the reference signal resources in the first set of reference signal resources. That is, the network device may indicate the position information of the CSI-IM resource by means of indicating the index information of the CSI-RS resource.

On this basis, the first determining module 901 may be configured to determine resource positions of reference signal resources corresponding to the index information as the resource positions of the reference signal resources in the second set of reference signal resources.

Third Specific Implementation

In a case that the reference signal resources in the second set of reference signal resources overlapping the reference signal resources in the first set of reference signal resources is any one case in the third example, the second configuration information configured by the network device may include index information of a RE subset of the reference signal resources in the first set of reference signal resources. That is, the network device may divide the third reference signal resources in the first set of reference signal resources into a plurality of RE subsets in advance, and then indicate, in the second configuration information, index information of a RE subset of the third reference signal resource, so as to indicate the resource positions of the reference signal resources in the second set of reference signal resources.

On this basis, the first determining module 901 may be configured to determine a RE subset corresponding to the index information as the reference signal resources in the second set of reference signal resources.

Figure 10:
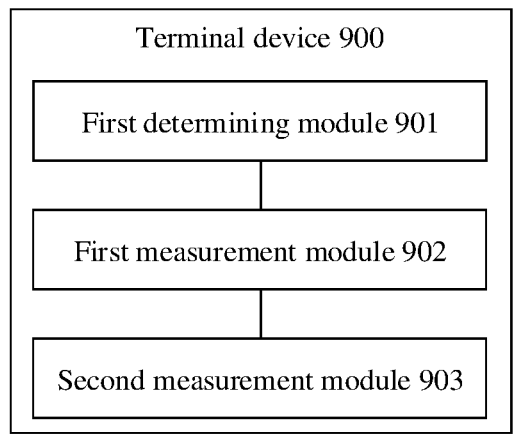
FIG. 10 is a second schematic structural diagram of a terminal device 900 according to an embodiment of this disclosure.

Optionally, as shown in FIG. 10, based on any one of the foregoing embodiments, the terminal device 900 provided in this embodiment of this disclosure may further include: a second measurement module 903.

The second measurement module 903 is configured to perform, based on QCL information of the first reference signal resource, measurement on a reference signal carried by the first reference signal resource, to obtain a channel corresponding to the first reference signal resource.

Optionally, the second measurement module 903 may be configured to determine, based on the QCL information of the first reference signal resource, a reception parameter used for receiving the reference signal carried by the first reference signal resource; receive, based on the reception parameter, the reference signal carried by the first reference signal resource; and determine, based on a received power of the reference signal carried by the first reference signal resource, the channel corresponding to the first reference signal resource.

Correspondingly, the first measurement module 902 may be configured to perform, based on the QCL information of the first reference signal resource, measurement on the reference signal carried by the at least one second reference signal resource, to obtain the interference corresponding to the first reference signal resource.

Optionally, the first measurement module 902 may be configured to determine, based on the QCL information of the first reference signal resource, a reception parameter used for receiving the reference signal carried by the at least one second reference signal resource; receive, based on the reception parameter, the reference signal carried by the at least one second reference signal resource; and determine, based on a received power of the reference signal carried by the at least one second reference signal resource, the channel corresponding to the first reference signal resource.

Figure 11:
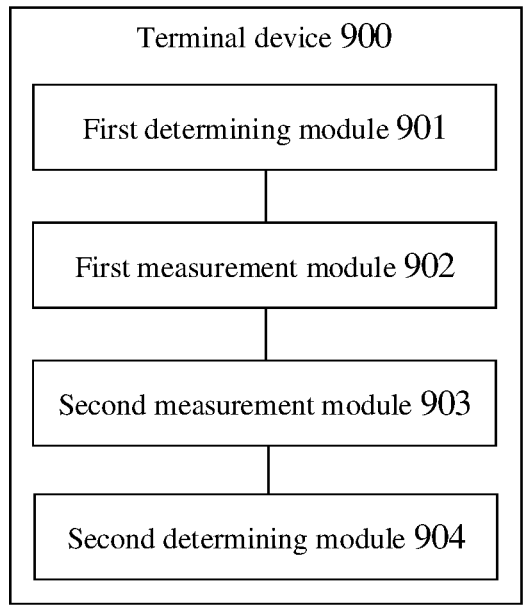
FIG. 11 is a third schematic structural diagram of a terminal device 900 according to an embodiment of this disclosure.

Optionally, as shown in FIG. 11, based on any one of the foregoing embodiments, the terminal device 900 provided in this embodiment of this disclosure may further include: a second determining module 904.

The second determining module 904 is configured to determine, based on the channel and the interference that are corresponding to the first reference signal resource, a signal quality measurement result corresponding to the first reference signal.

Optionally, a ratio of the channel corresponding to the first reference signal resource to the interference corresponding to the first reference signal resource may be determined as the signal quality measurement result (the SINR described above) corresponding to the first reference signal resource.

In this way, when the first reference signal resource is CSI-RS resource 1 transmitted by the network device by using a transmit beam 1, the measured SINR corresponding to the CSI-RS resource 1 may be used as a measurement result of the transmit beam 1.

According to the terminal device 900 provided in the embodiment shown in FIG. 11, the signal quality measurement result corresponding to the first reference signal resource can be further determined based on the interference with higher accuracy, so as to obtain a measurement result better reflecting signal quality of the beam corresponding to the first reference signal resource. In this way, the network device can determine, based on the measurement result, an ideal beam for sending a signal or channel to the terminal device, improving the throughput and reducing a block error rate.

Optionally, on the basis of any one of the foregoing embodiments, the terminal device 900 provided in this embodiment of this disclosure may further include: a selection module and a reporting module.

The selection module is configured to select, from the first set of reference signal resources, at least one first reference signal resource whose signal quality measurement result parameter satisfies a preset condition.

The reporting module is configured to report at least one of an index, a signal quality measurement result, or a channel that are of the at least one first reference signal resource that is selected.

For example, M first reference signal resources are selected from N first reference signal resources. Then, SINRs of the M first reference signal resources, indexes of the M first reference signal resources, and other information related to the SINRs corresponding to the M first reference signal resources are reported to the network device, so that the network device determines an ideal beam for transmitting a signal or channel to the terminal device.

The terminal device 900 shown in FIG. 9 to FIG. 11 may be used to implement the embodiments of the method for measuring a reference signal shown in FIG. 1, FIG. 6, and FIG. 7. For related details, refer to the foregoing method embodiments.

The following describes a network device 120 provided in an embodiment of this disclosure.

Figure 12:
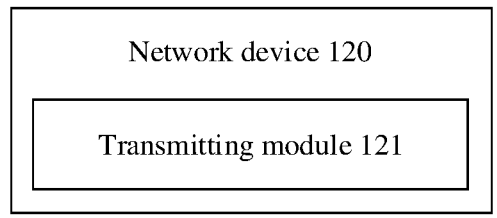
FIG. 12 is a schematic structural diagram of a network device 120 according to an embodiment of this disclosure.

As shown in FIG. 12, the network device 120 may include:

a transmitting module 121, configured to send first configuration information and second configuration information.

The first configuration information is used for determining a first set of reference signal resources by a terminal device, and the first set of reference signal resources are used for channel measurement; the second configuration information is used for determining a second set of reference signal resources by the terminal device, and the second set of reference signal resources are used for interference measurement; interference corresponding to a first reference signal resource in the first set of reference signal resources is obtained through measurement on a reference signal carried by at least one second reference signal resource in the second set of reference signal resources; and during measurement on the reference signal carried by the second reference signal resource, if the second reference signal resource overlaps a third reference signal resource in the first set of reference signal resources, a position for measuring the reference signal carried by the second reference signal resource is a resource position corresponding to the third reference signal resource.

The first configuration information and the second configuration information may be RRC information or other higher-layer information.

The first set of reference signal resources may include two or more reference signal resources. Optionally, the first set of reference signal resources may be SSB resources or CSI-RS resources. Still further, the first set of reference signal resources may be CSI-RS resources, because a CSI-RS-based channel measurement manner is finer than an SSB-based channel measurement manner, a channel obtained through measurement may be more accurate, good for multi-beam and multi-user scheduling on the network side.

Optionally, the first configuration information may further include information such as QCL information of the reference signal resources in the first set of reference signal resources and a value of a repetition parameter (repetition) of the first set of reference signal resources.

The second set of reference signal resources may alternatively include one or more reference signal resources. Optionally, the second set of reference signal resources may be CSI-IM resources.

Optionally, the first reference signal resource has an association relationship with the at least one second reference signal resource. The at least one second reference signal resource associated with one first reference signal resource is partially or completely the same as the at least one second reference signal resource associated with another first reference signal resource. The second reference signal resource having an association relationship with the first reference signal resource may be used to measure interference corresponding to the first reference signal resource.

Optionally, at least one reference signal resource in the first set of reference signal resources may overlap at least one reference signal resource in the second set of reference signal resources. For example, if one or more third reference signal resources are included in the first set of reference signal resources, one second reference signal resource and one third reference signal resource may partially or completely overlap, or one second reference signal resource may overlap a plurality of third reference signal resources. In addition, because a plurality of second reference signal resources may be included in the second set of reference signal resources, it may also be possible that a plurality of second reference signal resources and one third reference signal resource partially or completely overlap. The following uses an example for description.

In a first example, one reference signal resource in the first set of reference signal resources overlaps one reference signal resource in the second set of reference signal resources. For example, as shown in FIG. 2A to FIG. 2C, it is possible that REs in a resource element pattern (RE pattern) of one CSI-IM resource overlap those of one CSI-RS resource.

In a second example, a plurality of reference signal resource in the first set of reference signal resources overlap one reference signal resource in the second set of reference signal resources. For example, as shown in FIG. 3A and FIG. 3B, it is possible that REs of one CSI-IM resource overlap those of a plurality of CSI-RS resources.

In the first and second examples described above, the reference signal resources in the second set of reference signal resources and the reference signal resources in the first set of reference signal resources partially or completely overlap. When UE performs interference measurement on one beam, only a reference signal carried by a reference signal resource, overlapping a reference signal resource in the first set of reference signal resources, in the second set of reference signal resources is measured, leaving non-overlapping reference signal resources in the second set of reference signal resources unused, thereby resulting in a waste of the second set of reference signal resources.

Therefore, optionally, in the third example, the resource position occupied by the second reference signal resource may be a subset of a resource position occupied by at least one third reference signal resource; or the resource position occupied by the second reference signal resource and the resource position occupied by the at least one third reference signal resource completely overlap, where the resource position includes at least one of a time domain position or a frequency domain position. To be specific, a new RE pattern of the second reference signal resource (CSI-IM resource) can be designed, so that the RE pattern of the second reference signal resource (CSI-IM resource) becomes a subset of an RE pattern of the third reference signal resource (CSI-RS resource), or the RE pattern of the second reference signal resource (CSI-IM resource) is the same as the RE pattern of the third reference signal resource (CSI-RS resource).

For example, the designed RE pattern of the second reference signal resource is a target pattern, and all REs in the target pattern and some REs in the RE pattern of the at least one third reference signal resource overlap; or all REs in the target pattern and all REs in the RE pattern of the at least one third reference signal resource completely overlap.

FIG. 4A and FIG. 4B show a case that the RE pattern of the CSI-IM resource is a subset of the RE pattern of the CSI-RS resource. FIG. 5A and FIG. 5B show a case that the RE pattern of the CSI-IM resource is completely the same as the RE pattern of the CSI-RS resource. For specific overlapping cases, refer to the foregoing description. Details are not described herein again.

It is easy to understand that, compared to the first and second examples, in the third example, the second reference signal resource has no RE not overlapping that of the third reference signal resource. In this way, when only the reference signal carried by the second reference signal resource is measured on a resource position overlapping the third reference signal resource, there is no waste of the second reference signal resource. Correspondingly, the reference signal used for interference measurement is measured on the reference signal resource used for channel measurement, thereby reducing resource overheads.

In addition, according to the network device 120 in this embodiment of the present invention, when the configured reference signal resource for measuring the channel overlaps the reference signal resource for measuring the interference, Optionally, the reference signal carried by the reference signal resource for measuring interference may be measured by the UE on the resource position corresponding to the reference signal resource for measuring the channel, making the reference signal resource for measuring interference clearer. Therefore, accuracy of inter-beam interference measurement during beam measurement can be improved, and the network device can select an ideal beam for sending a signal or channel to the terminal device, improving the throughput and reducing a block error rate.

In the following three specific implementations, the process of configuring the second set of reference signal resources for the terminal device by the transmitting module 121 by using the second configuration information is described in detail.

First Specific Implementation

In a case that the reference signal resources in the second set of reference signal resources overlapping the reference signal resources in the first set of reference signal resources is any one case in the first to third examples, the second configuration information sent by the transmitting module 121 may explicitly include the resource position information of the reference signal resources in the second set of reference signal resources.

Second Specific Implementation

In a case that the reference signal resources in the second set of reference signal resources overlapping the reference signal resources in the first set of reference signal resources is the case described in the third example, the second configuration information sent by the transmitting module 121 may include the index information of the reference signal resources in the first set of reference signal resources, and resource positions of the reference signal resources corresponding to the index information are the resource positions of the reference signal resources in the second set of reference signal resources. That is, the network device may indicate the position information of the CSI-IM resource by means of indicating the index information of the CSI-RS resource.

Third Specific Implementation

In a case that the reference signal resources in the second set of reference signal resources overlapping the reference signal resources in the first set of reference signal resources is the case described in the third example, the second configuration information sent by the transmitting module 121 may include index information of a RE subset of the reference signal resources in the first set of reference signal resources, and a RE subset corresponding to the index information is the reference signal resources in the second set of reference signal resources. That is, the network device may divide the third reference signal resources in the first set of reference signal resources into a plurality of RE subsets in advance, and then indicate, in the second configuration information, index information of a RE subset of the third reference signal resource, so as to indicate the resource positions of the reference signal resources in the second set of reference signal resources.

Optionally, the network device shown in FIG. 12 may further include:

a receiving module, configured to receive at least one of an index, a signal quality measurement result, or a channel that are of the at least one first reference signal resource and reported by the terminal device.

The at least one first reference signal resource reported by the terminal device is the first reference signal resource whose signal quality measurement result satisfies a preset condition in the first set of reference signal resources, and the signal quality measurement result of the first reference signal resource is determined based on the channel and interference that are corresponding to the first reference signal resource.

For example, SINRs of the M fourth reference signal resources, indexes of the M fourth reference signal resources, and other information related to the SINRs corresponding to the M fourth reference signal resources that are reported by the terminal device are received, and then an ideal beam for transmitting a signal or channel to the terminal device is determined based on the reported information that is received.

The network device 120 shown in FIG. 12 may be configured to implement the embodiments of the method for configuring a reference signal resource shown in FIG. 8. For related details, refer to the foregoing method embodiments.

Figure 13:
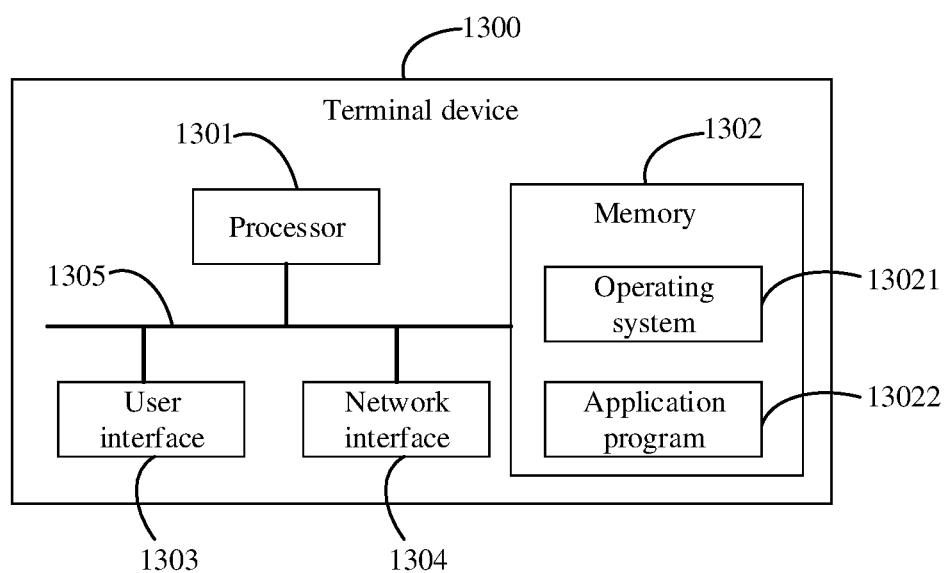
FIG. 13 is a schematic structural diagram of a terminal device 1300 according to an embodiment of this disclosure.

FIG. 13 is a schematic structural diagram of a terminal device according to another embodiment of this disclosure. The terminal device 1300 shown in FIG. 13 includes at least one processor 1301, a memory 1302, at least one network interface 1304, and a user interface 1303. The components of the terminal device 1300 are coupled together by using a bus system 1305. It may be understood that the bus system 1305 is configured to implement connection communication between these components. The bus system 1305 may include not only a data bus but also a power supply bus, a control bus, and a status signal bus. However, for clear description, various buses in FIG. 13 are marked as the bus system 1305.

The user interface 1303 may include a display, a keyboard, a click device (for example, a mouse or a trackball), a touch board, or a touchscreen.

It may be understood that the memory 1302 in this embodiment of this disclosure may be a volatile memory or a non-volatile memory, or may include both a volatile memory and a non-volatile memory. The non-volatile memory may be a read-only memory (ROM), a programmable read only memory (Programmable ROM, PROM), an erasable programmable read-only memory (Erasable PROM, EPROM), and an electrically erasable programmable read-only memory (Electrically EPROM, EEPROM), or flash memory. The volatile memory may be a random access memory (RAM), which is used as an external cache. As exemplary rather than restrictive description, many forms of RAM can be used, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchronous link dynamic random access memory (Synch Link DRAM, SLDRAM), and a direct Rambus random access memory (Direct Rambus RAM, DRRAM). The memory 1302 in the system and method described in the embodiments of this disclosure is intended to include but is not limited to these and any other suitable types of memories.

In some implementations, the memory 1302 stores the following elements: an executable module or a data structure, or a subset thereof, or an extended set thereof: an operating system 13021 and an application program 13022.

The operating system 13021 includes various system programs, such as a framework layer, a kernel library layer, and a driver layer, and is configured to implement various basic services and process hardware-based tasks. The application program 13022 includes various application programs, such as a media player, and a browser, and is configured to implement various application services. A program that implements the methods of the embodiments of this disclosure may be included in the application program 13022.

In this embodiment of this disclosure, the terminal device 1300 further includes: a program stored in the memory 1302 and capable of running on the processor 1301. When the program is executed by the processor 1301, the processes of the foregoing method for measuring a reference signal are implemented, with the same technical effects achieved. To avoid repetition, details are not described herein again.

The methods disclosed in the embodiments of this disclosure are applicable to the processor 1301, or implemented by the processor 1301. The processor 1301 may be an integrated circuit chip with a signal processing capability. In an implementation process, the steps in the foregoing method may be implemented by using a hardware integrated logic circuit in the processor 1301, or by using instructions in a form of software. The processor 1301 may be a general-purpose processor, a digital signal processor (DSP), an application-specific integrated circuit (ASIC), a field programmable gate array (FPGA) or another programmable logical device, a discrete gate or transistor logical device, or a discrete hardware component. The processor 1301 may implement or execute the methods, steps, and logical block diagrams disclosed in the embodiments of this disclosure. The general-purpose processor may be a microprocessor, or the processor may also be any conventional processor or the like. The steps of the methods disclosed with reference to the embodiments of this disclosure may be directly implemented by a hardware decoding processor, or may be implemented by a combination of hardware and software modules in a decoding processor. The software module may be located in a computer readable storage medium that is mature in the art, such as a random access memory, a flash memory, a read-only memory, a programmable read-only memory, or an electrically erasable programmable memory, or a register. The computer readable storage medium is located in the memory 1302, and the processor 1301 reads information in the memory 1302 and implements, in combination with its hardware, the steps of the foregoing methods. Optionally, a program is stored in the computer-readable storage medium, and when the program is executed by the processor 1301, the steps of the foregoing embodiment of the method for measuring a reference signal are implemented.

Figure 14:
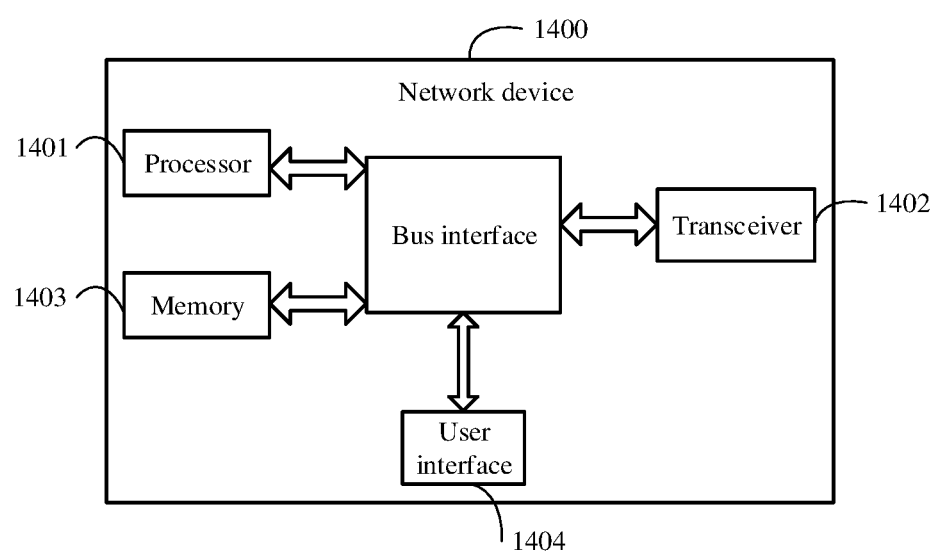
FIG. 14 is a schematic structural diagram of a network device 1400 according to an embodiment of this disclosure.

Referring to FIG. 14, FIG. 14 is a structural diagram of a network device to which the embodiments of this disclosure are applied. Details of the method for configuring a reference signal resource can be implemented to achieve the same effects. As shown in FIG. 14, the network device 1400 includes a processor 1401, a transceiver 1402, a memory 1403, a user interface 1404, and a bus interface.

In this embodiment of this disclosure, the network device 1400 further includes: a program stored in the memory 1403 and capable of running on the processor 1401. When the program is executed by the processor 1401, the processes of the foregoing method for configuring a reference signal resource are implemented, with the same technical effects achieved. To avoid repetition, details are not described herein again.

In FIG. 14, a bus architecture may include any quantity of interconnected buses and bridges, and Optionally connects together circuits that are of at least one processor represented by the processor 1401 and of a memory represented by the memory 1403. The bus architecture may further interconnect various other circuits such as a peripheral device, a voltage regulator, and a power management circuit. These are all well known in the art, and therefore are not further described in this specification. The bus interface provides an interface. The transceiver 1402 may be a plurality of components, that is, the transceiver 1402 includes a transmitter and a receiver, and provides a unit for communicating with various other apparatuses on a transmission medium. For different terminal devices, the user interface 1404 may also be an interface that can be externally or internally connected to a required device. The connected device includes but is not limited to a keypad, a display, a speaker, a microphone, a joystick, and the like.

The processor 1401 is responsible for management of the bus architecture and general processing, and the memory 1403 is capable of storing data that is used by the processor 1401 during operation.

It may be understood that the embodiments described in this disclosure may be implemented by hardware, software, firmware, middleware, microcode, or a combination thereof. For hardware implementation, the processing unit may be implemented in at least one application specific integrated circuit (ASIC), digital signal processor (DSP), digital signal processing device (DSP Device, DSPD), programmable logic device (PLD), field-programmable gate array (FPGA), general-purpose processor, controller, microcontroller, or microprocessor; or other electronic units for performing the functions described in this disclosure or a combination thereof.

For software implementation, the techniques described in the embodiments of this disclosure may be implemented by modules (such as processes and functions) that perform the functions described in the embodiments of this disclosure. Software code may be stored in the memory and executed by the processor. The memory may be implemented in or outside the processor.

An embodiment of this disclosure further provides a computer-readable storage medium, where the computer-readable storage medium stores a program. When the program is executed by a processor, the processes of the foregoing embodiment of the method for measuring a reference signal or the method for configuring a reference signal resource are implemented, with the same technical effects achieved. To avoid repetition, details are not described again herein. The computer-readable storage medium is, for example, a read-only memory (ROM), a random access memory (RAM), a magnetic disk, or an optical disc.

An embodiment of this disclosure further provides a program product including instructions. When a computer runs the instructions of the program product, the computer executes the foregoing method for measuring a reference signal or method for configuring a reference signal resource. Optionally, the program product can be run on the foregoing network device.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described again herein.

In the several embodiments provided in this disclosure, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this disclosure essentially, or the part contributing to the related art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method for measuring a reference signal, comprising:
determining, by a terminal device, a first set of reference signal resources and a second set of reference signal resources, wherein the first set of reference signal resources are used for channel measurement, and the second set of reference signal resources are used for interference measurement; and
performing, by the terminal device, measurement on a reference signal carried by at least one second reference signal resource in the second set of reference signal resources, to obtain interference corresponding to a first reference signal resource in the first set of reference signal resources, wherein during measurement on the reference signal carried by the second reference signal resource, if the second reference signal resource overlaps a third reference signal resource in the first set of reference signal resources, a position for measuring the reference signal carried by the second reference signal resource is a resource position corresponding to the third reference signal resource.

2. The method according to claim 1, wherein
the determining, by the terminal device, a first set of reference signal resources and a second set of reference signal resources comprises:
determining, by the terminal device, the first set of reference signal resources based on first configuration information that is sent from the network device and used for configuring the first set of reference signal resources; and
determining, by the terminal device, the second set of reference signal resources based on second configuration information that is sent from the network device and used for configuring the second set of reference signal resources.

3. The method according to claim 2, wherein
one or more third reference signal resources are comprised in the first set of reference signal resources, and the second reference signal resource and at least one of the third reference signal resources partially or completely overlap.

4. The method according to claim 3, wherein
a resource position occupied by the second reference signal resource is a subset of a resource position occupied by the at least one third reference signal resource; or
a resource position occupied by the second reference signal resource and a resource position occupied by the at least one third reference signal resource completely overlap; wherein the resource position comprises at least one of a time domain position or a frequency domain position.

5. The method according to claim 4, wherein
a resource element (RE) pattern of the second reference signal resource is a target pattern, wherein
all REs in the target pattern and part of REs in an RE pattern of the at least one third reference signal resource overlap; or
all REs in the target pattern and all REs in an RE pattern of the at least one third reference signal resource completely overlap.

6. The method according to claim 5, wherein
the second configuration information comprises index information of reference signal resources in the first set of reference signal resources, wherein the determining, by the terminal device, the second set of reference signal resources based on second configuration information that is sent from the network device and used for configuring the second set of reference signal resources, comprising:
determining, by the terminal device, resource positions of reference signal resources corresponding to the index information as the resource positions of the reference signal resources in the second set of reference signal resources;
or,
the second configuration information comprises index information of a RE subset of reference signal resources in the first set of reference signal resources, wherein the determining, by the terminal device, the second set of reference signal resources based on second configuration information that is sent from the network device and used for configuring the second set of reference signal resources, comprising:
determining, by the terminal device, a RE subset corresponding to the index information as the reference signal resources in the second set of reference signal resources.

7. The method according to claim 1, wherein
during measurement on the reference signal carried by the second reference signal resource, if the second reference signal resource overlaps the third reference signal resource in the first set of reference signal resources, the position for measuring the reference signal carried by the second reference signal resource is an overlapping resource position between the second reference signal resource and the third reference signal resource.

8. The method according to claim 1, further comprising:
performing, by the terminal device based on quasi co-location (QCL) information of the first reference signal resource, measurement on a reference signal carried by the first reference signal resource, to obtain a channel corresponding to the first reference signal resource.

9. The method according to claim 8, wherein
the performing, by the terminal device, measurement on a reference signal carried by at least one second reference signal resource in the second set of reference signal resources, to obtain interference corresponding to a first reference signal resource in the first set of reference signal resources comprises:
performing, by the terminal device based on the QCL information of the first reference signal resource, measurement on the reference signal carried by the at least one second reference signal resource, to obtain the interference corresponding to the first reference signal resource.

10. The method according to claim 9, wherein
the performing, by the terminal device based on the QCL information of the first reference signal resource, measurement on the reference signal carried by the at least one second reference signal resource, to obtain the interference corresponding to the first reference signal resource comprises:
determining, by the terminal device based on the QCL information of the first reference signal resource, a reception parameter used for receiving the reference signal carried by the at least one second reference signal resource;
receiving, by the terminal device based on the reception parameter, the reference signal carried by the at least one second reference signal resource; and determining, by the terminal device based on a received power of the reference signal carried by the at least one second reference signal resource, the interference corresponding to the first reference signal resource.

11. The method according to claim 9, further comprising:
determining, by the terminal device based on the channel and the interference that are corresponding to the first reference signal resource, a signal quality measurement result corresponding to the first reference signal.

12. The method according to claim 1, wherein
the first reference signal resource has an association relationship with the at least one second reference signal resource.

13. The method according to claim 12, wherein
the at least one second reference signal resource associated with one first reference signal resource is partially or completely the same as the at least one second reference signal resource associated with another first reference signal resource.

14. A terminal device, comprising a memory, a processor, and a program stored in the memory and capable of running on the processor, wherein when the program is executed by the processor, a method for measuring a reference signal is implemented, and the method comprises:
determining a first set of reference signal resources and a second set of reference signal resources, wherein the first set of reference signal resources are used for channel measurement, and the second set of reference signal resources are used for interference measurement; and
performing measurement on a reference signal carried by at least one second reference signal resource in the second set of reference signal resources, to obtain interference corresponding to a first reference signal resource in the first set of reference signal resources, wherein during measurement on the reference signal carried by the second reference signal resource, if the second reference signal resource overlaps a third reference signal resource in the first set of reference signal resources, a position for measuring the reference signal carried by the second reference signal resource is a resource position corresponding to the third reference signal resource.

15. The terminal device according to claim 14, wherein
the determining a first set of reference signal resources and a second set of reference signal resources comprises:
determining the first set of reference signal resources based on first configuration information that is sent from the network device and used for configuring the first set of reference signal resources; and
determining the second set of reference signal resources based on second configuration information that is sent from the network device and used for configuring the second set of reference signal resources.

16. The terminal device according to claim 15, wherein
one or more third reference signal resources are comprised in the first set of reference signal resources, and the second reference signal resource and at least one of the third reference signal resources partially or completely overlap.

17. The terminal device according to claim 14, wherein the method further comprises:
performing, based on quasi co-location (QCL) information of the first reference signal resource, measurement on a reference signal carried by the first reference signal resource, to obtain a channel corresponding to the first reference signal resource.

18. The terminal device according to claim 14, wherein
the first reference signal resource has an association relationship with the at least one second reference signal resource.

19. The terminal device according to claim 18, wherein
the at least one second reference signal resource associated with one first reference signal resource is partially or completely the same as the at least one second reference signal resource associated with another first reference signal resource.

20. A network device, comprising a memory, a processor, and a program stored in the memory and capable of running on the processor, wherein when the program is executed by the processor, a method for configuring a reference signal resource is implemented, and the method comprises:
sending first configuration information and second configuration information; wherein
the first configuration information is used for determining a first set of reference signal resources by a terminal device, and the first set of reference signal resources are used for channel measurement; the second configuration information is used for determining a second set of reference signal resources by the terminal device, and the second set of reference signal resources are used for interference measurement; interference corresponding to a first reference signal resource in the first set of reference signal resources is obtained through measurement on a reference signal carried by at least one second reference signal resource in the second set of reference signal resources; and during measurement on the reference signal carried by the second reference signal resource, if the second reference signal resource overlaps a third reference signal resource in the first set of reference signal resources, a position for measuring the reference signal carried by the second reference signal resource is a resource position corresponding to the third reference signal resource.

* * * * *